United States Patent
Davis et al.

(10) Patent No.: US 11,488,355 B2
(45) Date of Patent: *Nov. 1, 2022

(54) VIRTUAL WORLD GENERATION ENGINE

(71) Applicant: Amazon Technologies, Inc., Seattle, WA (US)

(72) Inventors: Collin Charles Davis, Seattle, WA (US); Michael Anthony Frazzini, Seattle, WA (US); Ashraf Alkarmi, Seattle, WA (US); Gerard Joseph Heinz, II, Seattle, WA (US); Michael Schleif Pesce, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,035

(22) Filed: Jun. 21, 2019

(65) Prior Publication Data

US 2019/0378331 A1    Dec. 12, 2019

Related U.S. Application Data

(63) Continuation of application No. 14/500,413, filed on Sep. 29, 2014, now Pat. No. 10,332,311.

(51) Int. Cl.
*G06T 17/20* (2006.01)
*G06F 16/78* (2019.01)
(Continued)

(52) U.S. Cl.
CPC .............. *G06T 17/20* (2013.01); *G06F 16/58* (2019.01); *G06F 16/739* (2019.01); *G06F 16/78* (2019.01);
(Continued)

(58) Field of Classification Search
None
See application file for complete search history.

(56) References Cited

U.S. PATENT DOCUMENTS 5,261,820 A    11/1993  Slye
5,395,242 A     3/1995  Slye
(Continued)

FOREIGN PATENT DOCUMENTS

WO    2008124941    4/2008

OTHER PUBLICATIONS

International Search Report and Written Opinion, dated Dec. 11, 2015, Amazon Technologies, Inc., pp. 1-17.
(Continued)

*Primary Examiner* — Saptarshi Mazumder
(74) *Attorney, Agent, or Firm* — Robert C. Kowert; Kowert, Hood, Munyon, Rankin & Goetzel, P.C.

(57) ABSTRACT

A virtual world generation engine and methods for generating virtual worlds from images collected from various sources, including crowdsourced images. A virtual world generation engine may obtain images (e.g., digital photographs, digital video frames, etc.) related to a particular real-world scene, combine the images using image processing techniques such as image stitching techniques to generate composite images representing a view of the scene, and generate models from the composite images. The models may be used in rendering video content representing virtual worlds generated from the collected images of real-world scenes; the video content may be streamed to client device (s). Obtaining the images, generating models, rendering video content from the models, and streaming the video content may be performed in response to user interactions
(Continued)

with video content on the client device(s) to allow interactive exploration of the virtual worlds in real-time or near-real time.

20 Claims, 17 Drawing Sheets

(51) Int. Cl.
G11B 27/034 (2006.01)
G06T 19/00 (2011.01)
G06F 16/738 (2019.01)
G06F 16/58 (2019.01)
G11B 27/031 (2006.01)
G06T 9/00 (2006.01)

(52) U.S. Cl.
CPC .......... *G06T 19/003* (2013.01); *G11B 27/031* (2013.01); *G11B 27/034* (2013.01); *G06T 9/00* (2013.01)

(56) References Cited

U.S. PATENT DOCUMENTS

| | | | |
|---|---|---|---|
| 5,682,196 A | 10/1997 | Freeman | |
| 6,222,551 B1 | 4/2001 | Schneider et al. | |
| 6,266,068 B1 | 7/2001 | Kang et al. | |
| 7,803,052 B2 | 9/2010 | Multerer | |
| 8,645,230 B2 | 2/2014 | Oliver | |
| 9,032,020 B2* | 5/2015 | Gregg | H04N 21/2743 709/203 |
| 10,332,311 B2 | 6/2019 | Davis et al. | |
| 2008/0253685 A1* | 10/2008 | Kuranov | G06T 3/4038 382/284 |
| 2009/0161963 A1* | 6/2009 | Uusitalo | G06F 16/748 382/203 |
| 2009/0237492 A1* | 9/2009 | Kikinis | H04N 13/398 348/47 |
| 2010/0088195 A1* | 4/2010 | Bellamy | G06Q 30/0601 705/26.1 |
| 2010/0331047 A1 | 12/2010 | Bilcu et al. | |
| 2011/0213482 A1 | 2/2011 | Saarela | |
| 2011/0199372 A1 | 8/2011 | Porter et al. | |
| 2011/0268369 A1 | 11/2011 | Richards et al. | |
| 2012/0076368 A1 | 3/2012 | Staudacher et al. | |
| 2012/0244948 A1 | 3/2012 | Dhillon | |
| 2012/0192115 A1* | 7/2012 | Falchuk | G06F 3/04815 715/850 |
| 2013/0011121 A1 | 1/2013 | Forsyth et al. | |
| 2013/0208997 A1 | 8/2013 | Liu | |
| 2013/0222369 A1 | 8/2013 | Huston et al. | |
| 2013/0231999 A1 | 8/2013 | Emrich | |
| 2014/0129394 A1 | 1/2014 | Oliver | |
| 2014/0036022 A1* | 2/2014 | Croen | H04N 7/147 348/14.01 |
| 2014/0132603 A1 | 5/2014 | Raghoebardayal et al. | |
| 2014/0171039 A1 | 6/2014 | Bjontegard | |
| 2014/0274354 A1 | 9/2014 | George et al. | |
| 2014/0274355 A1 | 9/2014 | George et al. | |
| 2014/0279121 A1 | 9/2014 | George et al. | |
| 2015/0043892 A1* | 2/2015 | Groman | H04N 21/4627 386/278 |
| 2015/0215564 A1* | 7/2015 | Robinson | H04N 21/4884 348/468 |
| 2015/0294153 A1 | 10/2015 | Naithani et al. | |

OTHER PUBLICATIONS

Noah Snavely, et al., "Scene Reconstruction and Visualization From Community Photo Collections", Proceeding of the IEEE, vol. 98, No. 8, Aug. 2010, pp. 1370-1390.

Fabrizio Lamberti, et al., "A Streaming-Based Solution for Remote Visualization of 3D Graphics on Mobile Devices", IEEE Transactions on Visualization and Computer Graphics, vol. 13, No. 2, Mar./Apr. 2007, pp. 247-260.

WilloxH: "Microsoft Photosynth", YouTube video, Jul. 27, 2006, Retrieved from the Internet: URL: https://www.youtube.com/watch?v=p16frkJLViO, p. 1.

TED Blog Video: "Exclusive demo: The new Photosynth lets you swoop through 3d panoramas", YouTube video, Dec. 11, 2013, Retrieved from the Internet: URL: https://www.youtube.com/watch?v=4LxlhoemR3a, p. 1.

U.S. Appl. No. 14/500,451, filed Sep. 20, 2014, Michael Anthony Frazzini.

U.S. Appl. No. 14/500,619, filed Sep. 29, 2014, Christian Robert Cabanero.

U.S. Appl. No. 14/500,593, filed Sep. 29, 2014, Christian Robert Cabanero.

U.S. Appl. No. 14/500,600, filed Sep. 29, 2014, Christian Robert Cabanero.

U.S. Appl. No. 14/500,580, filed Sep. 29, 2014, Christian Robert Cabanero.

U.S. Appl. No. 14/318,093, filed Jun. 27, 2014, Michael Martin George.

Amazon Web Services, "Amazon AppStream Developer Guide", 2014, pp. 1-195.

"Generations of Game Analytics, Achievements and High Scores", Ben Medler, Eludamos Journal for Computer Game Culture vol. 3, No. 2, 2009, pp. 177-194.

U.S. Appl. No. 14/318,083, filed Jun. 27, 2014, Michael Martin George.

U.S. Appl. No. 14/318,117, filed Jun. 27, 2014, Michael Martin George.

U.S. Appl. No. 14/317,961, filed Jun. 27, 2014, Michael Martin George.

Amar, Nir, et al. "Synthesizing reality for realistic physical behavior of virtual objects in augmented reality applications for smartphones." Virtual Reality (VR), 2013 IEEE. IEEE, 2013, pp. 1-2.

Lok, Benjamin, et al. "Incorporating dynamic real objects into immersive virtual environments." Proceedings of the 2003 symposium on Interactive 3D graphics. ACM, 2003, pp. 31-40.

"Unity Manual", accessed Jun. 27, 2014, pp. 1-32.

U.S. Appl. No. 14/318,302, filed Jun. 27, 2014, Michael Schleif Pesce.

U.S. Appl. No. 14/318,273, filed Jun. 27, 2014, Michael Schleif Pesce.

U.S. Appl. No. 14/318,042, filed Jun. 27, 2014, Gerald Joseph Heinz.

U.S. Appl. No. 14/076,815, filed Nov. 11, 2013, Jonathan Paul Thompson.

U.S. Appl. No. 14/077,180, filed Nov. 11, 2013, Gerard Joseph Heinz, II.

U.S. Appl. No. 14/077,186, filed Nov. 11, 2013, Gerard Joseph Heinz, II.

Wang, Jue, et al. "Interactive video cutout." ACM Transactions on Graphics (TOG). vol. 24. No. 3. ACM, 2005, pp. 585-594.

Smolic, Aljoscha, et al. "3d video and free viewpoint video-technologies, applications and mpeg standards." Multimedia and Expo, 2006 IEEE International Conference on. IEEE, 2006, pp. 1-56.

Karsten, Muller, et al. "View synthesis for advanced 3D video systems." EURASIP Journal on Image and Video Processing 2008 (2009), pp. 1-11.

Balian, Luca, et al. "Unstructured video-based rendering: Interactive exploration of casually captured videos." ACM Transactions on Graphics (TOG) 29.4 (2010): 87, pp. 1-10.

Smolic, Aljoscha, Hideaki Kimata, and Anthony Vetro. "Development of MPEG standards for 3D and free viewpoint video." Optics East 2005. International Society for Optics and Photonics, 2005, pp. 1-13.

U.S. Appl. No. 14/317,984, filed Jun. 27, 2014, Gerald Joseph Heinz, II.

U.S. Appl. No. 14/318,026, filed Jun. 27, 2014, Gerald Joseph Heinz, II.

(56) References Cited

OTHER PUBLICATIONS

U.S. Appl. No. 14/318,002, filed Jun. 27, 2014, Gerald Joseph Heinz, II.
U.S. Appl. No. 14/318,013, filed Jun. 27, 2014, Gerald Joseph Heinz, II.

* cited by examiner

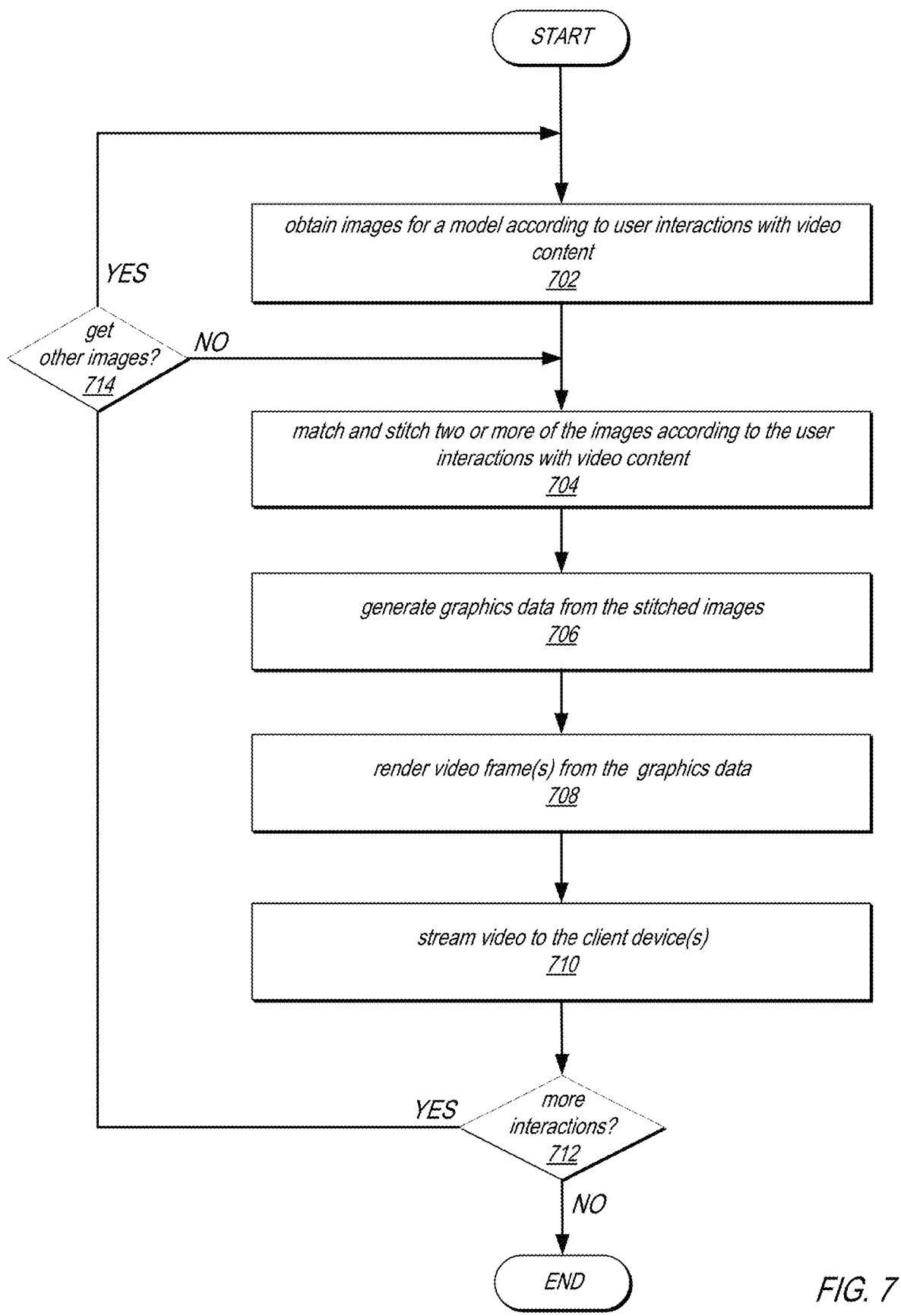

US 11,488,355 B2

VIRTUAL WORLD GENERATION ENGINE

This application is a continuation of U.S. patent application Ser. No. 14/500,413, filed Sep. 29, 2014, which is hereby incorporated by reference herein in its entirety.

BACKGROUND

Much video content produced today, including but not limited to movies, television and cable programs, and games, is at least partially generated using two-dimensional (2D) or three-dimensional (3D) computer graphics techniques. For example, video content for online multiplayer games and modern animated movies may be generated using various computer graphics techniques as implemented by various graphics applications to generate 3D representations or models of scenes, and then applying rendering techniques to render 2D representations of the scenes. As another example, scenes in some video content may be generated by filming live actor(s) using green- or blue-screen technology, and filling in the background and/or adding other content or effects using one or more computer graphics techniques.

Generating a scene using computer graphics techniques may, for example, involve generating a background for the scene, generating one or more objects for the scene, combining the background and objects(s) into a 3D representation or model of the scene, and applying rendering techniques to render a representation of the model of the scene as output. Each object in a scene may be generated according to an object model that includes but is not limited to an object frame or shape (e.g., a wire frame), surface texture(s), and color(s). Rendering of a scene may include applying global operations or effects to the scene such as illumination, reflection, shadows, and simulated effects such as rain, fire, smoke, dust, and fog, and may also include applying other techniques such as animation techniques for the object(s) in the scene. Rendering typically generates as output sequences of 2D video frames for the scenes, and the video frame sequences may be joined, merged, and edited as necessary to generate final video output, for example a movie or game sequence.

BRIEF DESCRIPTION OF THE DRAWINGS

FIG. 7 is a flowchart of a method for dynamically generating and rendering video content from image collections and streaming the video content to client devices in response to user interactions with video content, according to at least some embodiments.

Figure 1:
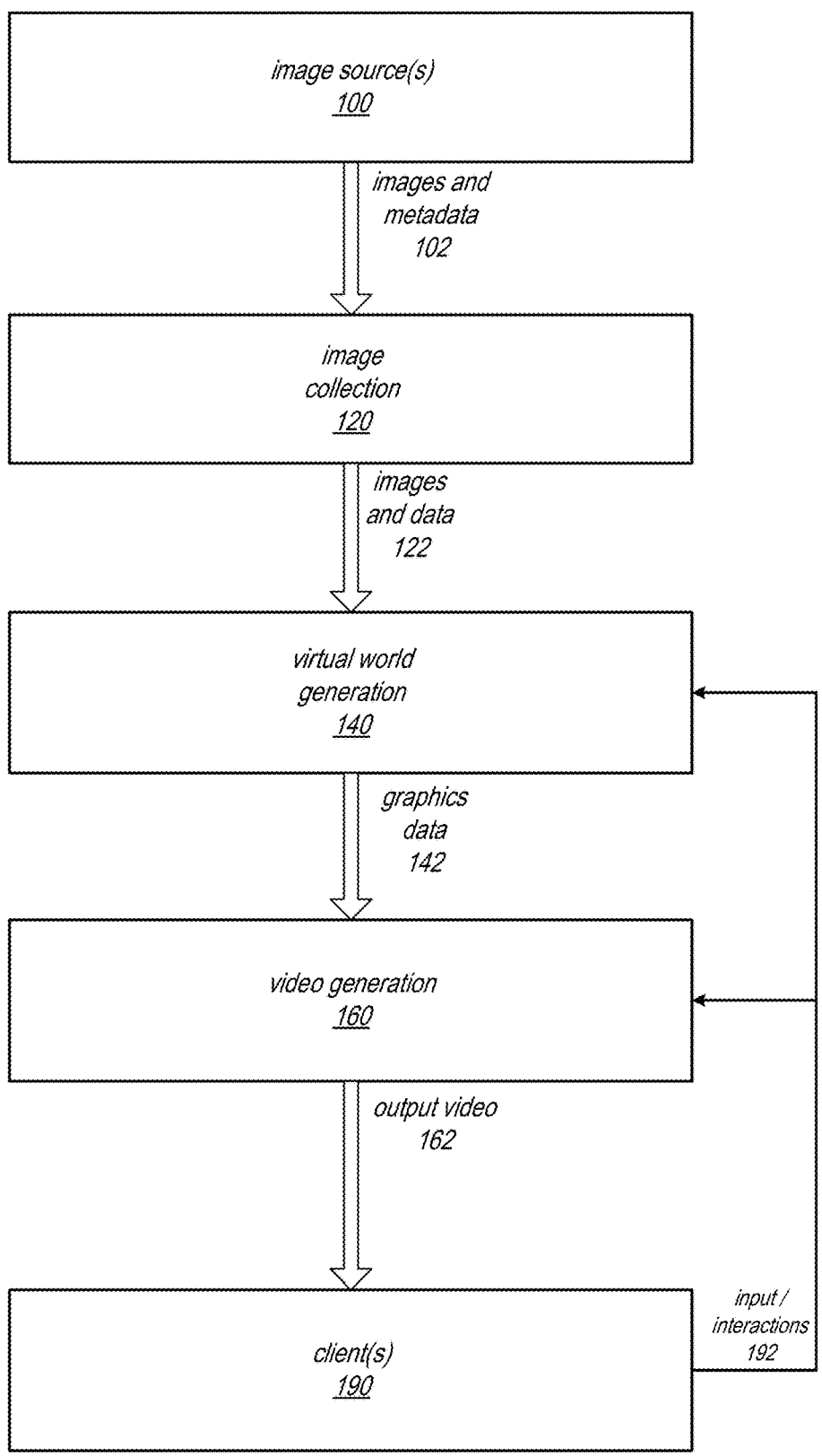
FIG. 1 is a high-level block diagram illustrating operations of an example system for dynamically generating and rendering virtual worlds from images collected from one or more sources, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus are described for generating and providing two-dimensional (2D) and three-dimensional (3D) modeled worlds, collective referred to herein as virtual worlds, from images collected from one or more sources. Embodiments of virtual world generation methods and modules may obtain images (e.g., digital photographs, digital video frames, etc.) and image data collected from one or more sources and generate 2D and/or 3D graphics data (e.g., collections of 2D images, or 3D models) from the images. The graphics data may be provided to one or more users. The virtual world generation methods and modules may be implemented as or in a virtual world generation engine. The graphics data generated by the virtual world generation engine may, for example, be used in rendering video content representing a virtual world generated from the input images. The rendered video content may be sent to one or more client devices. In at least some embodiments, obtaining the images, generating graphics data from the obtained images, rendering the graphics data to generate video output, and sending the video content to the client device(s) may be performed in response to user interactions with video content on the client device(s) to allow users to interactively explore the virtual worlds generated from the collected images in real-time or near-real time.

Embodiments of a virtual world generation engine may, for example, be implemented in or leveraged by various video systems to dynamically generate virtual worlds or models of real-world scenes or objects (e.g., places, buildings, monuments, natural features, etc.) from digital images (e.g., still photographs, video frames, etc.) collected from one or more sources. The video systems may, for example, allow users to interactively explore the virtual worlds generated from the collected images in real-time or near-real time. Video systems in which embodiments of the virtual world generation engine may be implemented or leveraged include but are not limited to real-time video exploration (RVE) systems and online game systems.

FIGS. 8 through 12 illustrate example embodiments of an RVE system that may generate, render, and stream new video content to client devices in response to user interactions with and within the video content. An RVE system may, for example, enable interactive exploration of virtual worlds accessed from video content in pre-rendered, pre-recorded video by generating and rendering new video content in real time. An RVE system may, for example, allow a user to step into a scene in a video to explore, manipulate, and modify video content in a virtual world dynamically generated and rendered for the scene via an RVE client interface. An RVE system may include or access a virtual world generation engine as described herein to generate 2D or 3D graphics data (e.g., 2D or 3D models of objects, backgrounds, etc.) for the virtual world of the scene from collections of digital images (e.g., digital photographs, video frames, etc.) related to the scene content. The RVE system may render new video content at least in part from the graphics data generated by the virtual world generation engine. The new video content may, for example, be streamed to one or more client devices.

In some embodiments, the virtual world generation engine may leverage image collection functionality implemented by an image collection module or service to obtain digital images (e.g., still photographs, video frames, etc.) and corresponding image metadata from one or more sources. The sources may include, but are not limited to, crowdsourcing, and other digital image collections or repositories accessible via a network, including but not limited to online collections or repositories. In some embodiments, the image collection module or service may analyze the images and metadata to collate and organize the images according to subject matter of or in respective scenes (e.g., particular places, objects, buildings, monuments, landscapes, etc.) and other factors (e.g., time of day, date, month, year, etc.), and may maintain image data indicating associations between images or groups of images and particular subject matter, as well as associations or relationships between or among particular images. In some embodiments, the virtual world generation engine may leverage the image data maintained by the image collection module or service to obtain particular images or groups of images from which virtual worlds or models corresponding to real-world scenes or objects are generated.

Embodiments of a video system such as an RVE system that includes or accesses a virtual world generation engine may leverage network-based resources (computation resources, storage resources, and services, including but not limited to a streaming service and protocol) to enable interactive exploration of dynamically generated and rendered virtual worlds by users, for example from within video content streamed to respective client devices. The computational power available through the network-based resources may allow a video system and virtual world generation engine to provide low-latency responses to users' interactions with video content via respective client devices, thus providing responsive and interactive exploratory experience to the users. In addition, the network-based resources enable the interactive exploration of the virtual worlds via client devices that have limited bandwidth, processing, and/or storage capabilities, such as smartphone, tablet, and pad devices. In at least some embodiments, image collection and storing, virtual world generation, and at least some rendering may be performed for the client devices on or by the network-based resources, allowing "thin" client software and interfaces to be used on the client devices. The computational power available through the network-based computation resources, as well as the video streaming capabilities provided through a streaming service and protocol, may allow the video system to dynamically generate and provide different video content to many different users on many different client devices in real time.

Figure 13:
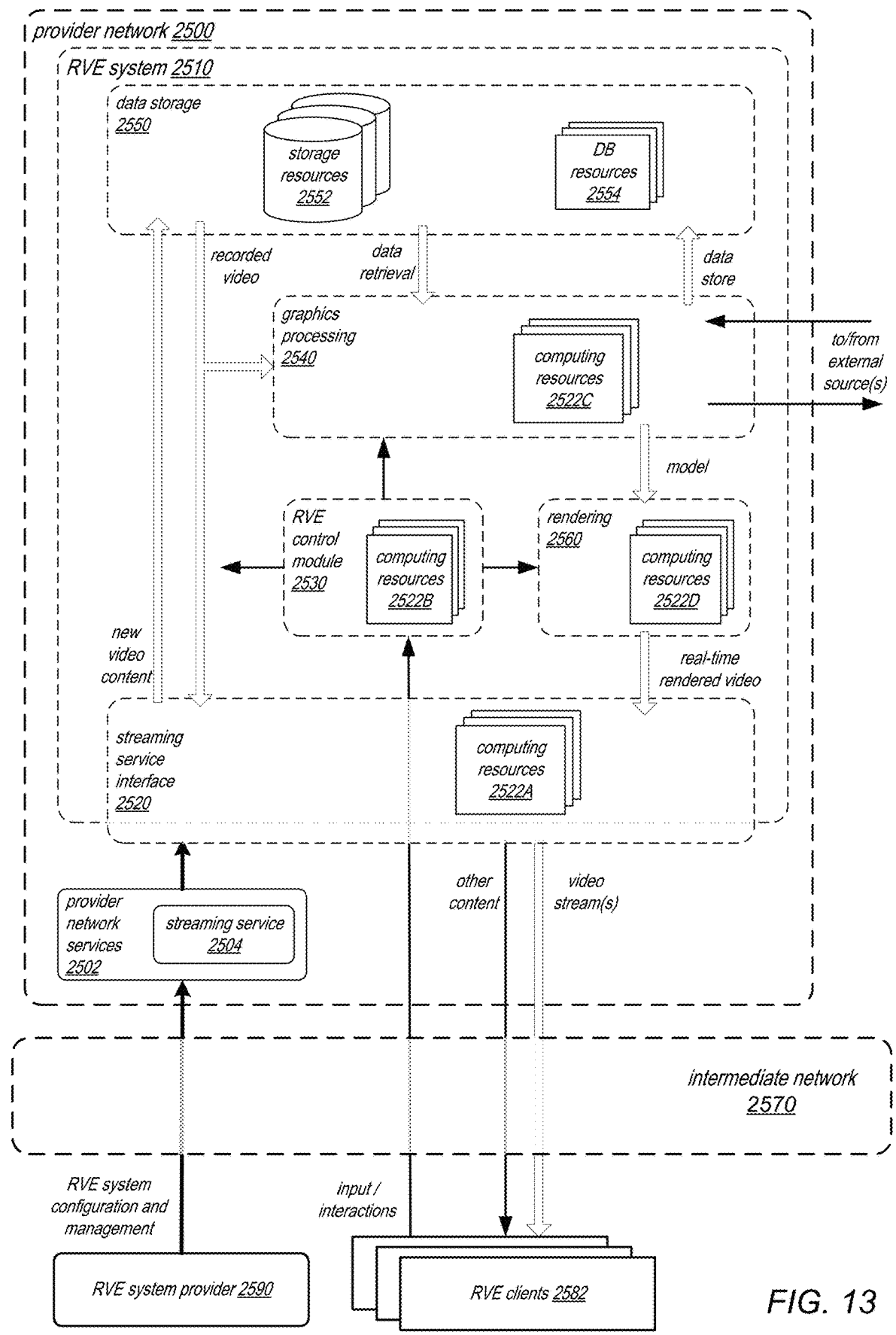
FIG. 13 illustrates an example network-based RVE environment, according to at least some embodiments.
Figure 14:
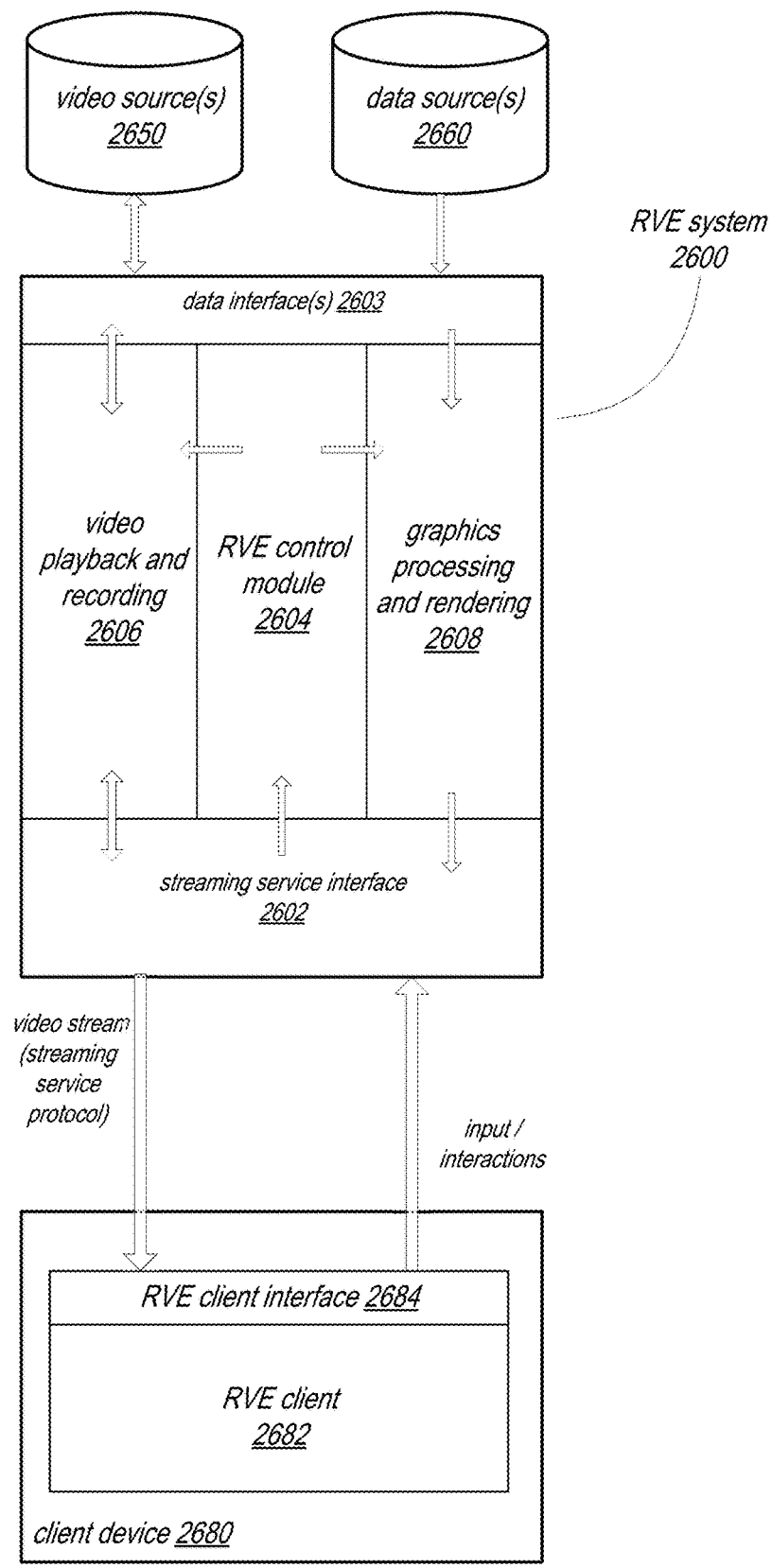
FIG. 14 illustrates an example network-based environment in which a streaming service is used to stream rendered video to clients, according to at least some embodiments.
Figure 15:
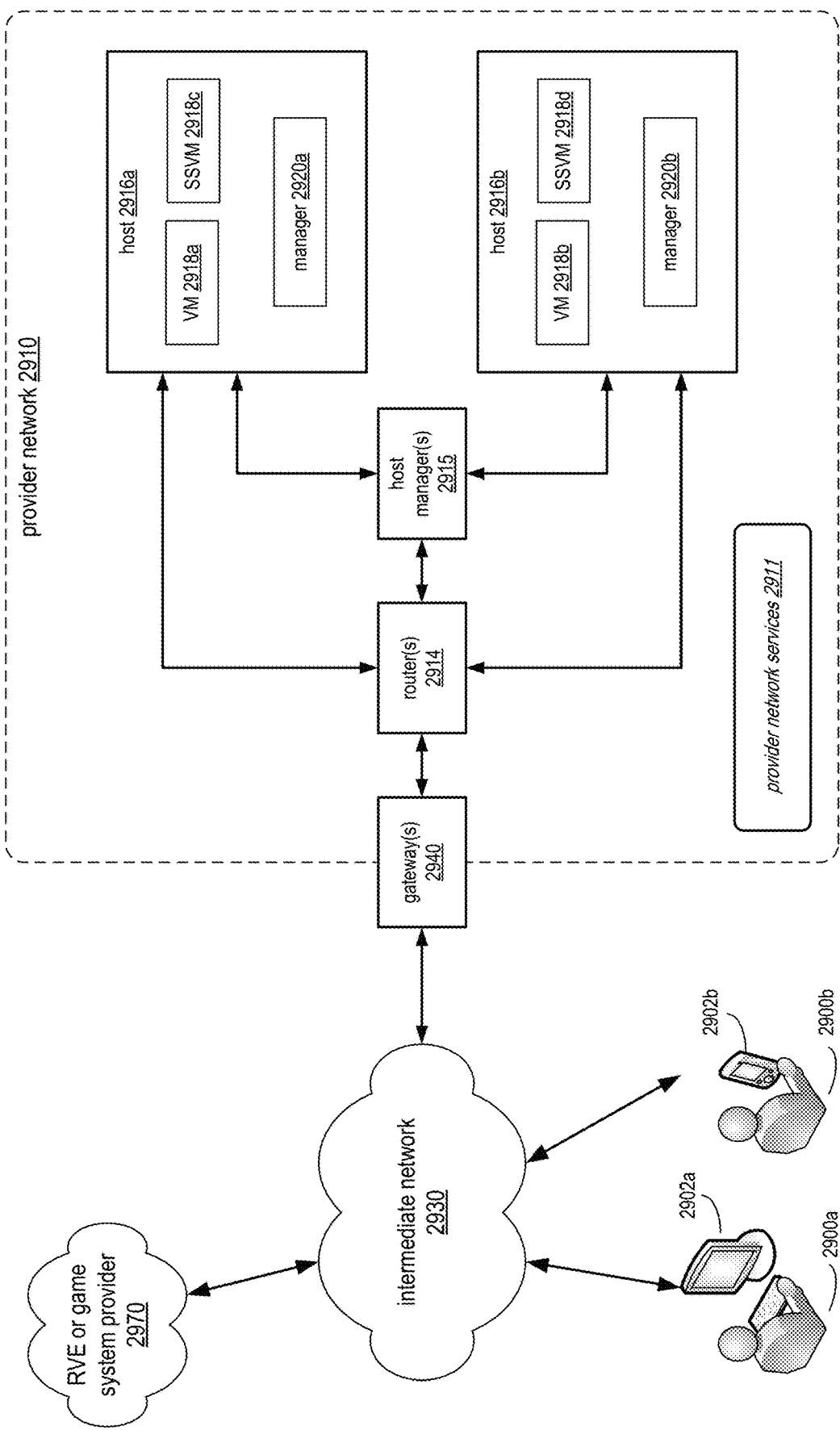
FIG. 15 is a diagram illustrating an example provider network environment in which embodiments as described herein may be implemented.
Figure 16:
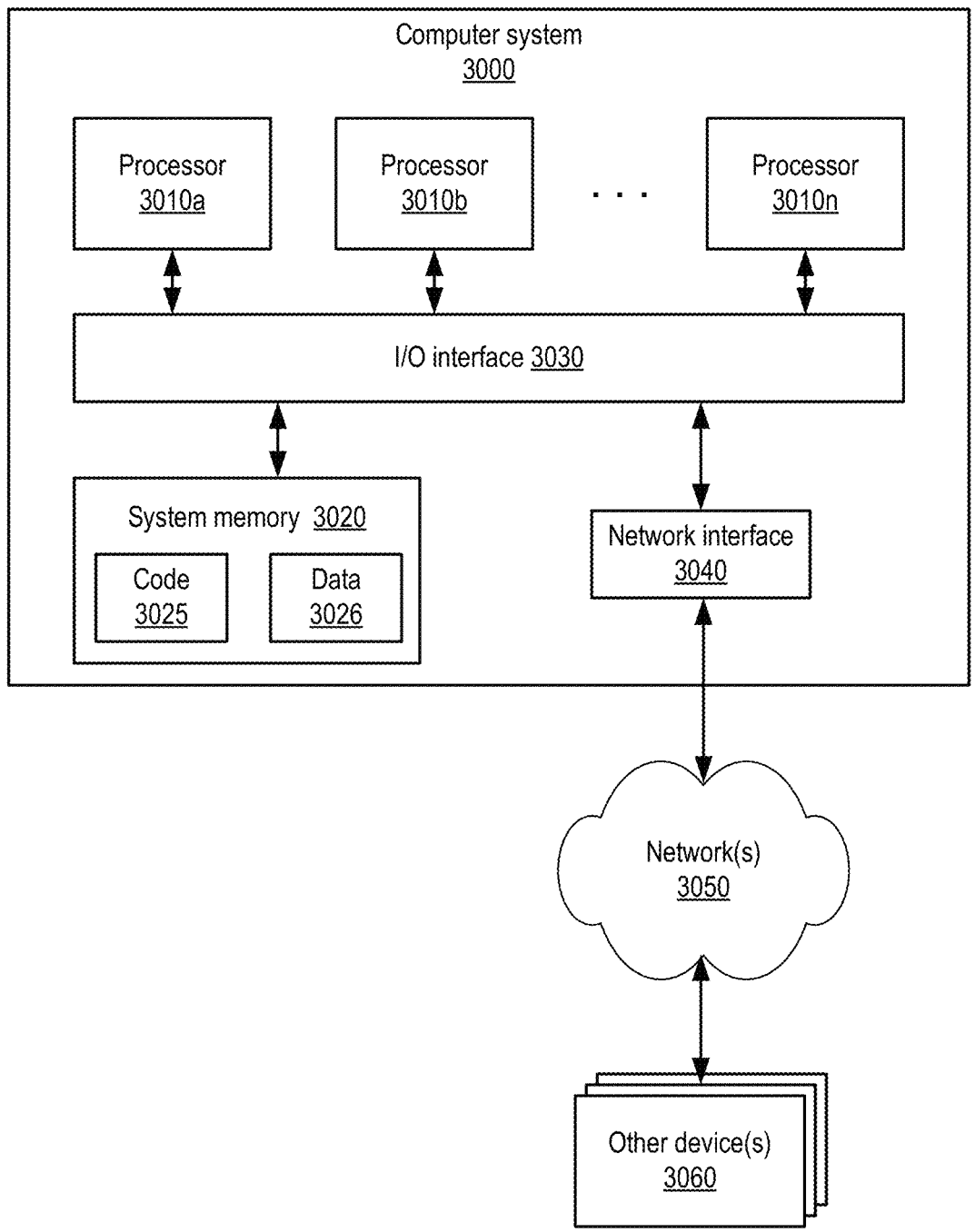
FIG. 16 is a block diagram illustrating an example computer system that may be used in some embodiments.

FIG. 13 illustrates an example RVE system and environment that may include a virtual world generation engine and in which network-based computation resources may be leveraged to provide real-time, low-latency graphics processing, rendering, and streaming of video content to client devices. In some embodiments, a virtual world generation engine may be implemented as part of graphics processing 2540 module, and at least in part by computing resources 2522C, as illustrated in FIG. 13. FIG. 14 illustrates an example network-based environment in which a streaming service may be used to stream rendered video to clients, according to at least some embodiments. For example, in some embodiments, a virtual world generation engine may be implemented as part of graphics processing and rendering 2608 module(s) in FIG. 14. FIG. 15 illustrates an example provider network environment in which embodiments of an RVE system that leverages or implements a virtual world generation engine as described herein may be implemented. FIG. 16 is a block diagram illustrating an example computer system that may be used in some embodiments.

FIG. 1 is a high-level block diagram illustrating operations of an example system for dynamically generating and rendering virtual worlds from images collected from one or more sources, according to at least some embodiments. As shown in FIG. 1, image collection 120 functionality may collect or otherwise obtain images and metadata 102 (e.g., digital photographs and corresponding image metadata, video frames, etc.) from one or more image sources 100. In some embodiments, image collection 120 may be implemented as a module or component of the virtual world generation 140 engine. Alternatively, in some embodiments, the image collection 120 functionality may be implemented separately from the virtual world generation 140 engine, for example as an image collection service or system, or as a module or component of another system or service such as a digital asset repository system or service.

Figure 5:
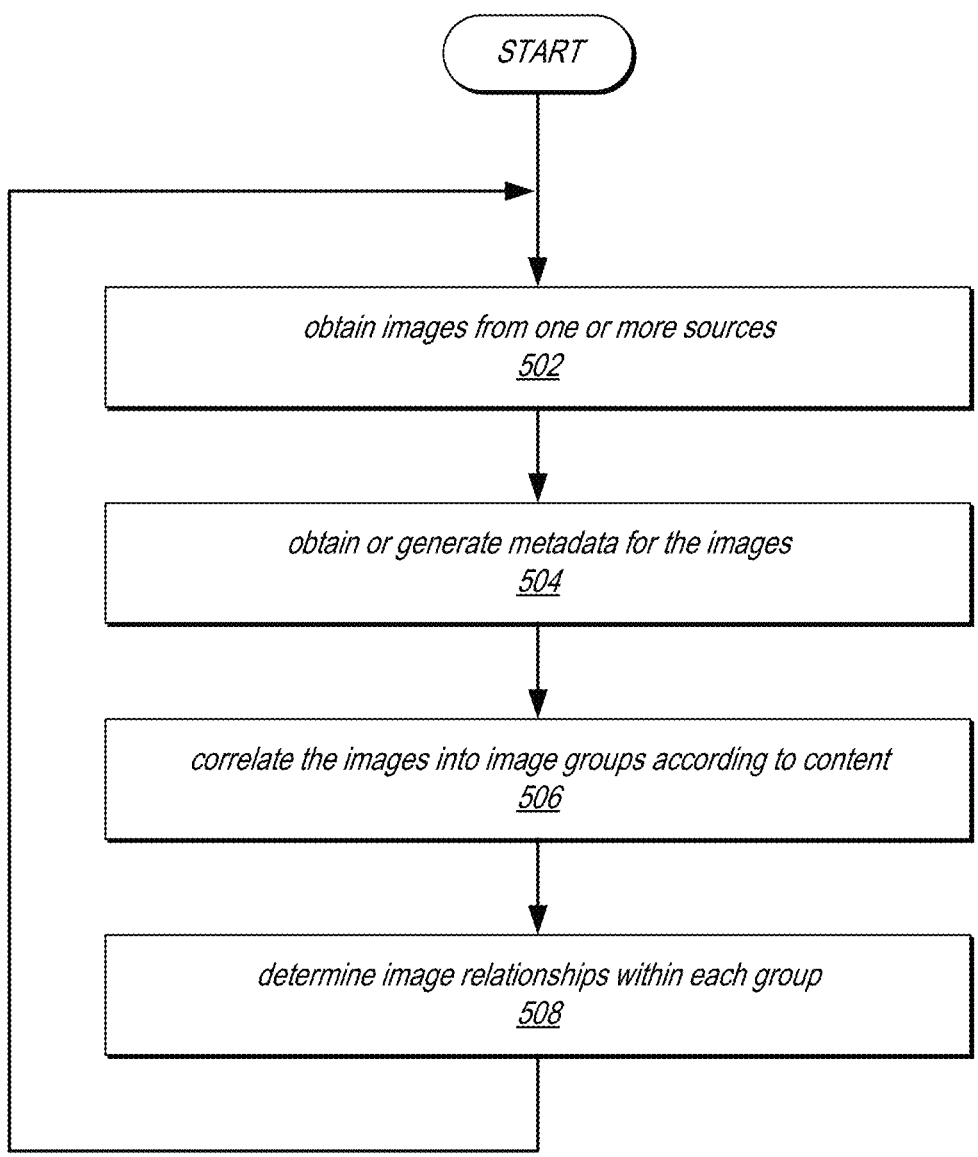
FIG. 5 is a high-level flowchart of a method for collecting and correlating images, according to at least some embodiments.

FIG. 5 is a high-level flowchart of a method for collecting and correlating images that may be implemented by an image collection 120 module or service, according to at least some embodiments. As indicated at 502 of FIG. 5, image collection 120 may obtain images from one or more sources. The images may, for example, be digital photographs or video frames that capture different portions of a variety of real-world scenes or objects. As indicated at 504 of FIG. 5, image collection 120 may obtain or generate metadata for the images. The metadata for a given image may include information describing one or more characteristics of the respective image. As indicated at 506 of FIG. 5, image collection 120 may correlate the images into image groups according to image content and/or image metadata. Each image group may correspond to a particular real-world scene. As indicated at 508 of FIG. 5, image collection 120 may determine image relationships within each group. For example, image collection 120 may determine spatial relationships among the images within each image group according to one or more of content of the images or image metadata indicating positioning of the images relative to the scene. In some embodiments, mage collection 120 may maintain the images, image metadata, and image data describing the image groups in an accessible repository, for example for access by a virtual world generation 140 engine. As indicated by the arrow returning from element 508 to element 502, the method of FIG. 5 may be an iterative or continuous process. The elements of FIG. 5 are explained in more detail below.

Referring again to FIG. 1, in some embodiments, image collection 120 may employ one or more crowdsourcing techniques to solicit and obtain digital images 102 from large numbers of people, referred to as online contributors, in various online communities. A crowdsourcing technique may, for example use one or more social media channels, websites, web advertising, or other channels to solicit input. Image collection 120 may provide an interface via which the online contributors may provide digital images. In some embodiments, image collection 120 may instead or in addition obtain or collect digital images 102 from other digital photograph collections or repositories accessible via a network, including but not limited to online collections or repositories, curated image collections, and so on. In some embodiments, image collection 120 may store the images and metadata 102 to an image repository or store. In some embodiments, the image repository or store may be maintained for or by the image collection 120 module or service. Alternatively, in some embodiments, images and metadata 102 may instead or in addition be stored to a repository external to the image collection 120 module or service, for example an image or digital asset repository maintained by another system or service such as a digital asset repository system or service.

In some embodiments, image collection 120 may collect and store images of various image file formats (e.g., TIFF (Tagged Image File Format), GIF (Graphics Interchange Format), JPEG (Joint Photographic Expert Group), etc.). In some embodiments, image collection 120 may only accept images of a particular image file format, for example JPEG format. In some embodiments, image collection 120 may collect images of various image file formats and convert the images to a common image file format (e.g., TIFF). In some embodiments, images may be sourced from video. In some embodiments, image collection 120 may extract video frames from the videos and convert the frames from a video format to a common image file format (e.g., JPEG).

In some embodiments, image collection 120 may analyze the collected images and metadata 102 to correlate and organize the images according to the subject matter of the real-world scenes (e.g., particular places, objects, scenes, buildings, monuments, landscapes, etc.) captured in the images. In some embodiments, one or more other image characteristics may also be used in correlating the images, including but not limited to timestamps of the images and camera settings used in capturing the images as indicated in image metadata. In some embodiments, to correlate images, image collection 120 may apply one or more image processing techniques to identify content or features in the images and determine relationships among the images according to the identified content or features. In some embodiments, image collection 120 may maintain image data indicating determined associations between images or groups of images and particular subject matter, as well as determined associations or relationships between or among particular images.

Figure 6A:
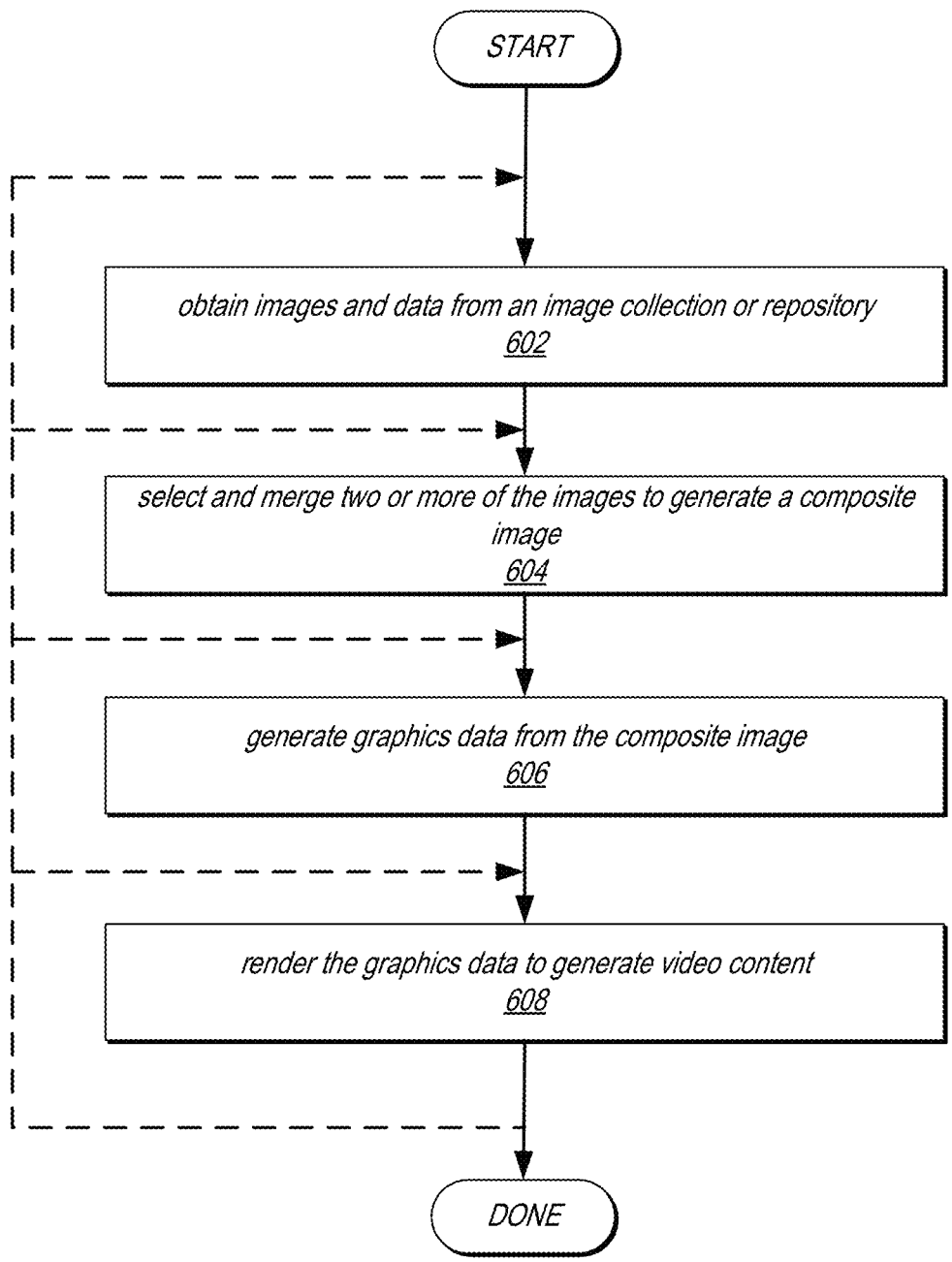
FIG. 6A is a high-level flowchart of a method for dynamically generating and rendering virtual worlds from a collection or repository of images, according to at least some embodiments.

FIG. 6A is a high-level flowchart of a method for dynamically generating and rendering virtual worlds from a collection or repository of images that may be implemented by a virtual world generation 140 engine, according to at least some embodiments. As indicated at 602 of FIG. 6A, virtual world generation 140 engine may obtain images and data from an image collection or repository, for example via an image collection 120 module or service. As indicated at 604 of FIG. 6A, the virtual world generation 140 engine select and combine two or more of the images to generate a composite image. As indicated at 606 of FIG. 6A, the virtual world generation 140 engine may generate graphics data (e.g., 2D or 3D model(s)) from the composite image. As indicated at 608 of FIG. 6A, the graphics data may be rendered to generate video content. In some embodiments, the virtual world generation 140 engine provides the graphics data generated from composite image(s) to video generation 160 module(s) for rendering. As indicated by the dashed lines with arrows returning to elements 602, 604, 606, and 608, the method may be an iterative process that may return to any of the elements as necessary to generate additional graphics data and render video content for a scene being explored by a user.

Figure 6B:
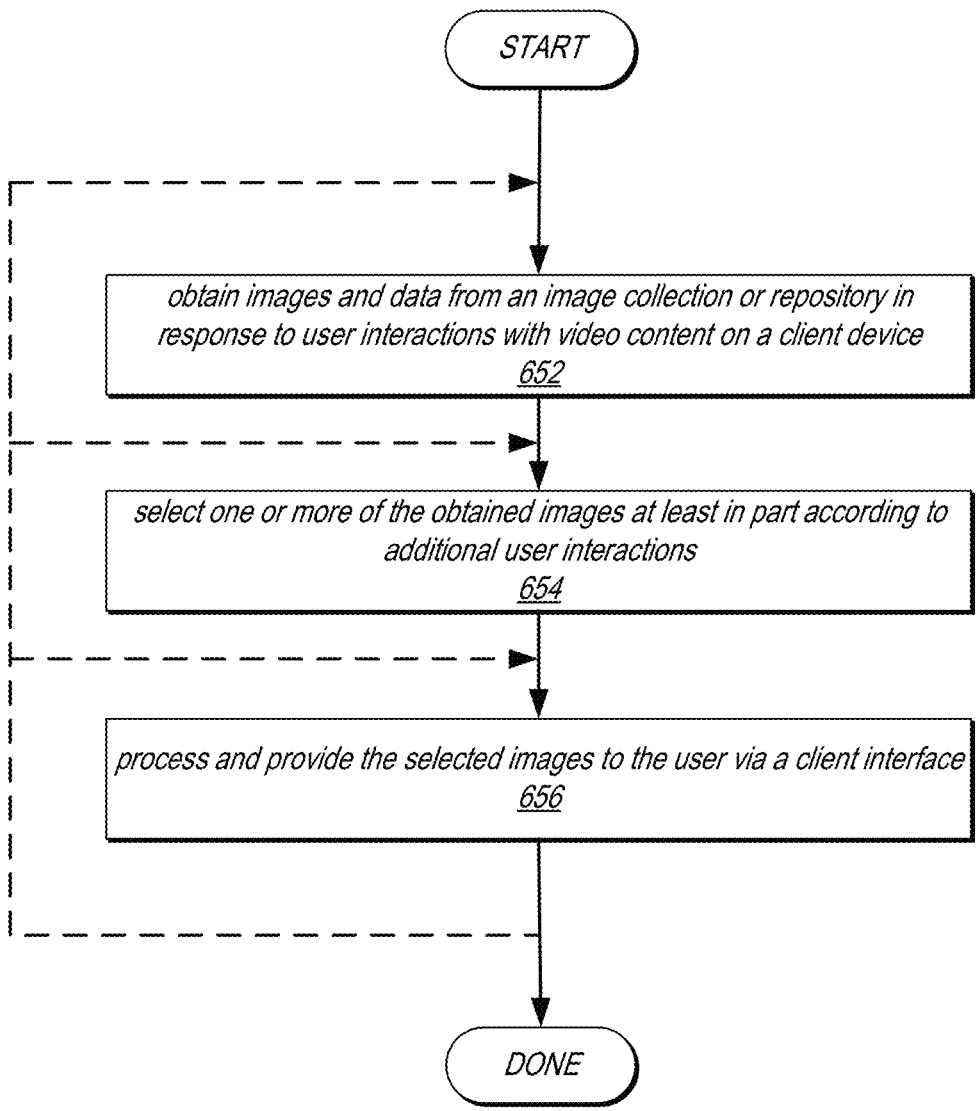
FIG. 6B is a high-level flowchart of a method for dynamically providing images related to particular video content being explored by a client from a collection or repository of images, according to at least some embodiments.

FIG. 6B is a high-level flowchart of a method for dynamically providing images related to particular video content being explored by a client from a collection or repository of images, according to at least some embodiments. In some embodiments, instead of or in addition to generating composite images, generating graphics data from the composite images, and rendering video content from the models, a virtual world generation 140 module may dynamically obtain images and data from an image collection 120 module, select images from the obtained images to present to a user, process the images as and if necessary, and provide the images to the user via a user interface. The image collection 120 module may dynamically collect at least some of the images from one or more sources 100, for example crowdsourcing sources, in response to requests from the virtual world generation 140 module.

As indicated at 652 of FIG. 6B, a virtual world generation 140 engine may obtain images and data from an image collection or repository in response to user interactions with video content on a client device. For example, a user may be viewing a scene in a video, and may pause the video to interactively explore the scene, for example as described in reference to FIG. 9. Virtual world generation 140 engine may identify a location of or other content of the scene from the video or video metadata, and may request images and data related to the scene content from a data collection 120 module. The image collection 120 module may identify images related to the scene content in an image repository, or may dynamically collect at least some of the images from one or more sources 100, for example crowdsourcing sources, in response to the request from the virtual world generation 140 module.

As indicated at 654 of FIG. 6B, the virtual world generation 140 module may select one or more of the obtained images at least in part according to additional user interactions. For example, user interactions with the scene may indicate a particular location, viewpoint, or orientation for viewing scene content, or particular content within the scene that the user wants to view or explore, and one or more images may be identified according to the interactions by analyzing image content and/or image metadata to match images to the intent of the user interactions.

As indicated at 656 of FIG. 6B, the virtual world generation 140 module may process and provide the selected images to the user via a client interface. In some embodiments, the virtual world generation 140 module may perform some processing on the selected images as and if necessary. For example, one, two or more of the images may be converted to a common format for display on a specific client device, or may be processed according to one or more image processing techniques to adjust or match image characteristics such as size, aspect ratio, orientation, lighting, brightness, focus, contrast, and color. In some embodiments, processing may include matching or aligning the images to determine spatial, content, or other relationships among the images. In some embodiments, thumbnails of the images may be generated. After processing, the selected images may be provided to the user via a client interface. As non-limiting examples, the images may be presented as a slide show, or may be presented in a tile format, or selectable thumbnails may be presented that the user can select to view the full-sized images. In some embodiments, the images may be arranged or presented according to the determined spatial, content, or other relationships. In some embodiments, an image stitching technique may be applied to two or more of the selected images to generate one or more combined images, and the combined image(s) may be presented to the user via the interface as 2D images.

As indicated by the dashed lines with arrows returning to elements 652, 654, and 656 the method of FIG. 6B may be an iterative process that may return to any of the elements as necessary to obtain, select, process, and provide relevant images for a scene being explored by a user.

The elements of FIGS. 6A and 6B are explained in more detail below.

Referring again to FIG. 1, the virtual world generation 140 engine may obtain images and image data 122 from image collection 120, for example according to an application programming interface (API) provided by the image collection 120 module or service. In some embodiments, the virtual world generation 140 engine may leverage the image data maintained by the image collection module or service to identify and obtain particular images or groups of images from which virtual worlds corresponding to real-world scenes or objects may be generated.

In some embodiments, the virtual world generation 140 engine may identify two or more of the images that include overlapping portions of a real-world scene to be used as component images. In some embodiments, the virtual world generation 140 engine may identify images that overlap in the horizontal dimension and/or in the vertical dimension. In some embodiments, the virtual world generation 140 engine may determine the overlapping images according to content or features of the images and/or according to image metadata corresponding to the images and indicating relationships between images and/or positioning of the images relative to each other in the scene. In some embodiments, to identify overlapping images, the virtual world generation 140 engine may apply one or more image processing techniques to identify content or features in the images and determine relationships among the images according to the identified content or features.

In some embodiments, the virtual world generation 140 engine may combine the identified component images using one or more digital image processing techniques to generate a composite image representing a view of the scene or of a portion of the scene. In some embodiments, to generate the composite image, the virtual world generation 140 engine may apply one or more of various image stitching techniques to register or align the component images and merge the aligned component images into a composite image. An image stitching technique may, for example, apply an image alignment or registration technique to register or align the component images according to the content or features of the images and/or according to the image data corresponding to the images and indicating relationships between or positioning of the component images in the scene. The image alignment or registration technique may generate image alignment information that may be used to combine or merge the overlapping component images. An image stitching technique may apply one or more image processing methods to non-overlapping and overlapping portions of the component images as identified by the image alignment to generate composited image content.

In some embodiments, the virtual world generation 140 engine may convert the component images to a common image file format prior to combining the images, if necessary. In some embodiments, the virtual world generation 140 engine may apply one or more image processing techniques to the component images prior to combining the images, and/or to the resulting composite image. For example, in some embodiments, the virtual world generation 140 engine may apply one or more image content analysis and scaling techniques to the individual component images to adjust content of the images to a common or normalized scale. As another example, the virtual world generation 140 engine may apply one or more image processing techniques to the individual component images and/or to the composite image to adjust color, luminance, brightness, contrast, focus, vertical/horizontal orientation, or other qualities of the image(s) to obtain a more uniform image quality. As another example, the virtual world generation 140 engine may apply one or more image processing techniques to the composite image to at least partially correct artifacts that may be left by the image stitching technique, or by other image processing techniques.

In some embodiments, the virtual world generation 140 engine may generate a 2D or 3D model of the scene, or of an object in the scene, from the composite image. One or more of various automated 2D or 3D reconstruction or modeling techniques may be used to generate 2D or 3D models and graphics information from the content of the composite image and/or component images. For example, in some embodiments, a 3D modeling technique may identify, or leverage previous identified, features in the composite image and/or in the component images to determine reference points, depth, perspective, orientation, and other 3D information for the scene and/or for object(s) in the scene, and then use this information to generate a 3D model (e.g., a wire-frame model, or other geometric model) of the scene or object. The virtual world generation 140 engine may generate and output 2D or 3D graphics data 142 including but not limited to a 3D model.

In some embodiments, the virtual world generation 140 engine may provide the graphics data 142 to a video generation 160 system, module, component, or layer. In some embodiments, video generation 160 may apply one or more 3D-to-2D rendering techniques to render 2D video content or frames 162 from 3D graphics data 142, and may stream or otherwise send the rendered video content or frames 162 to one or more clients 190. In some embodiments, video generation 160 may combine or merge other graphics data obtained from other sources with the graphics data 142 received from the virtual world generation 140 engine to generate video content or frames 162. In some embodiments, video generation 160 may combine or merge video content generated from the graphics data 142 received from the virtual world generation 140 engine with video received from one or more other sources to generate video content or frames 162.

Figure 3:
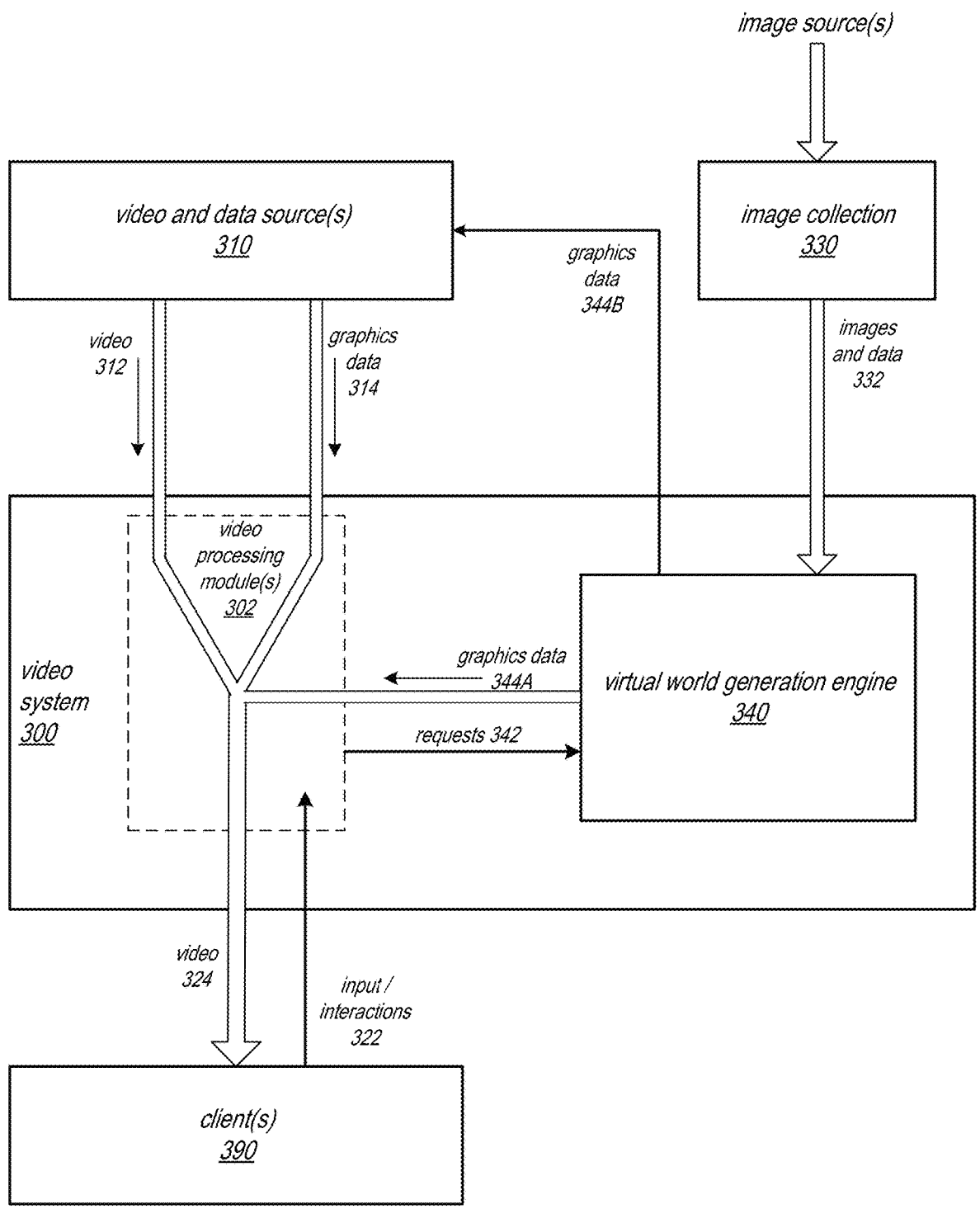
FIG. 3 illustrates a video system that includes a virtual world generation engine or module, according to at least some embodiments.

In some embodiments, virtual world generation 140 and video generation 160 may be performed at least in part according to input/interactions 192 received from a client 190 device. For example, virtual world generation 140 and video generation 160 may be implemented by a video system such as a real-time video exploration (RVE) system or game system that generates video content at least in part in response to user interactions with video content as shown in FIG. 3.

Figure 2:
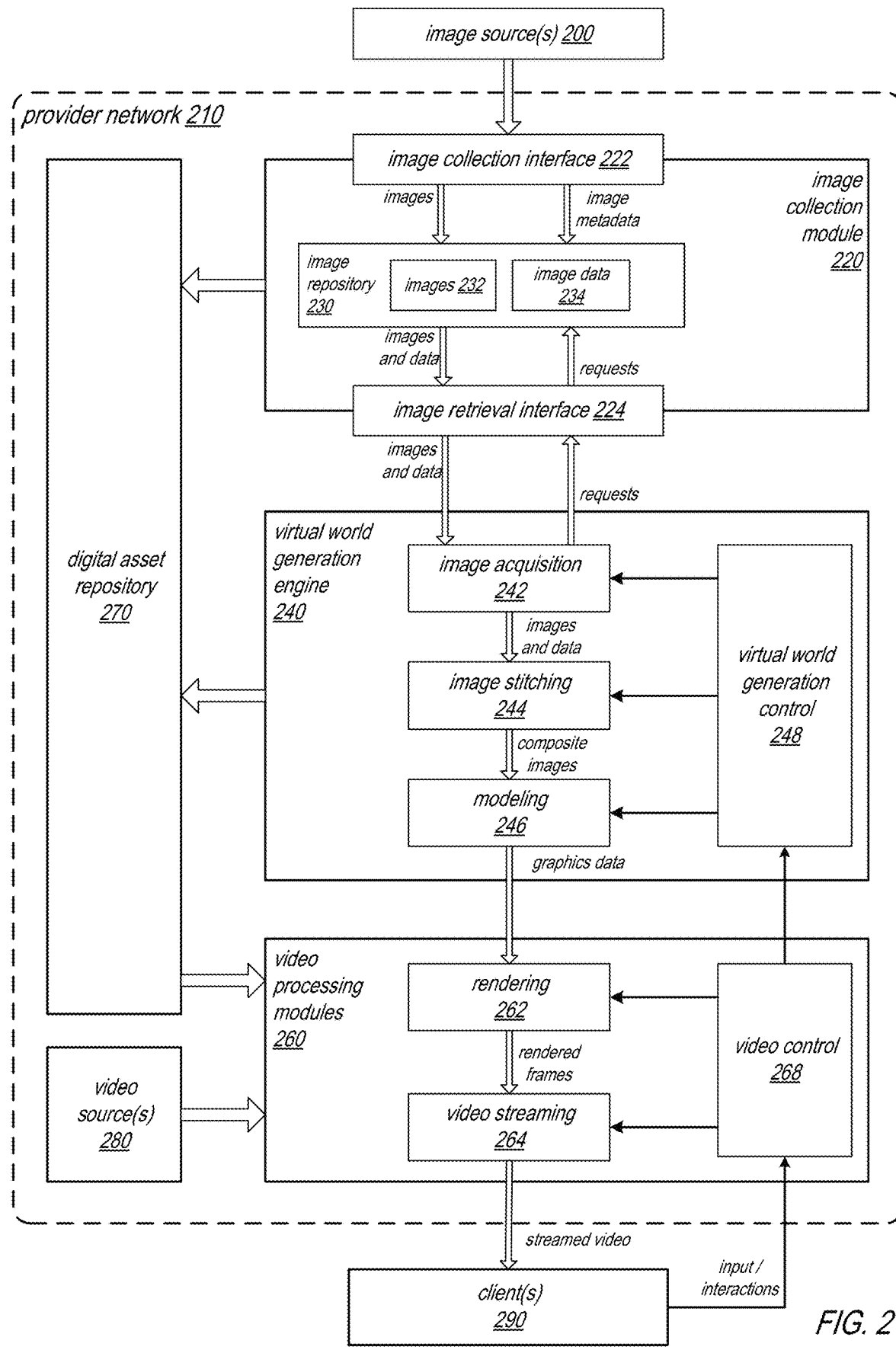
FIG. 2 illustrates image collection, virtual world generation, and video processing implemented and performed by network-based resources in a provider network environment, according to at least some embodiments.

FIG. 2 illustrates image collection 220, virtual world generation 240, and video processing 260 functionality implemented and performed by network-based resources in a provider network 210 environment, according to at least some embodiments. Embodiments of the systems and methods as described herein, including real-time video explorer (RVE) systems and methods, game systems and methods, image collection 220 modules or services, virtual world generation 240 engines or services, video processing 260 modules, and digital asset repositories 270 may be implemented in the context of a service provider that provides resources (e.g., computing resources, storage resources, database (DB) resources, etc.) on a provider network 210 to clients of the service provider. FIG. 15 illustrates an example service provider network 210 environment in which image collection 220, virtual world generation 24, and video processing 260, and other systems and methods as described herein may be implemented.

As shown in FIG. 2, in some embodiments, image collection functionality may be implemented as an image collection module, service, or system 220 on a provider network 210. The image collection module 220 may collect or otherwise obtain images and image metadata (e.g., digital photographs and corresponding image metadata, video frames, etc.) from one or more image sources 200. In some embodiments, the image sources 200 may include one or more crowdsourcing techniques. In some embodiments, image collection module 220 may provide an image collection interface 222 via which various crowdsourced contributors may provide digital images and image metadata, and/or via which images and metadata may be collected from one or more other online sources. In some embodiments, image collection module 220 may store the images and metadata 232 to an image repository 230. In some embodiments, images and metadata 232 may be instead or in addition be stored to an external repository 270, for example to a digital asset repository 270 maintained by another system or service such as a digital asset repository system or service.

In some embodiments, image collection module 220 may analyze the collected images and metadata 232 to, for example, correlate and organize the images. The images may, for example, be correlated according to the subject matter of the real-world scenes captured in the images, and/or according to one or more other image characteristics such as timestamps and camera settings. In some embodiments, image collection module 220 may generate and maintain image data 234 indicating determined associations between images 232 or groups of images and particular subject matter, as well as determined associations or relationships between or among particular images. For example, in some embodiments, image collection module 220 may generate and maintain image data 234 that associates real-world scenes or objects (e.g., places, buildings, monuments, natural features, etc.) and particular groups of images.

As non-limiting examples, particular images or group of images (digital photographs, video frames, etc.) may be collected for and associated with the Eiffel Tower, the Grand Canyon (or a part or portion of the Grand Canyon such as particular overlook or trail), Manhattan, Rockefeller Plaza in Manhattan, the Statue of Liberty, the Queen Elizabeth II, the Grand Teton Mountains, the New York, London, or Paris subways, and so on. In some embodiments, the groups may be further divided according to other characteristics of the images, for example characteristics as indicated in the image metadata such as timestamps, camera settings, geolocation or global positioning (GPS) information, and so on, or characteristics determined from analyzing the images such as focus, image quality, brightness, contrast, color, etc. As an example, a large group of images associated with a particular scene or object may be further divided according to time of day, season, or other time and calendar factors as indicated by timestamps and/or image features. For example, an image group related to Rockefeller Plaza may include subgroups for day and night images, spring, summer, fall and winter images, Christmas images, and so on. As another example, images in a group may be further divided by, or may be searchable by, other factors as indicated in the image metadata and/or by analysis of the image content including but not limited to camera settings, geolocation or global positioning (GPS) information, image quality, lighting, brightness, focus and contrast, color, and so on.

As shown in FIG. 2, in some embodiments, virtual world generation functionality may be implemented as or by a virtual world generation engine, module, service, or system 240 on a provider network 210. In some embodiments, the virtual world generation engine 240 may include one or more components, modules, or layers such as an image acquisition 242 module, an image stitching 244 module, and a modeling 246 module. In some embodiments, the virtual world generation engine 240 may include a virtual world generation control module 248.

In some embodiments, image acquisition 242 module may request and obtain images and image data from image collection module 220 via an image retrieval interface 224, for example an application programming interface (API), provided by the image collection module 220. In some embodiments, image acquisition 242 module may search or query the image data 232 maintained by the image collection module 222 via interface 224 to identify particular images 232 or groups of images from which virtual worlds corresponding to particular real-world scenes or objects may be generated. For example, in some embodiments, image acquisition 242 module may request images of a particular scene or object such as the Teton Mountains or the Eiffel Tower taken at a particular time of day, or in a particular season, and in some embodiments may specify additional qualifiers such as location and orientation, particular camera settings, and so on. In some embodiments, instead of or in addition to generating virtual worlds from the obtained images, the obtained images may be presented to a user as a collection of relevant 2D images via a client interface, for example as illustrated in FIG. 6B.

In some embodiments, an image stitching 244 module of the virtual world generation engine 240 may identify may identify two or more of the acquired images that include overlapping portions of a real-world scene or object to be used as component images, and may 240 combine the identified component images using one or more digital image processing techniques to generate a composite image representing a view of the scene or of a portion of the scene. In some embodiments, to generate the composite image, image stitching 244 module may apply one or more of various image stitching techniques to register or align the component images and merge the aligned component images into a composite image. In some embodiments, image stitching 244 module or other modules of the virtual world generation engine 240 may apply one or more other image processing techniques to the component images prior to combining the images, and/or to the resulting composite image, for example image processing techniques that change, adjust, or modify one or more image characteristics prior to or after image stitching is applied.

In some embodiments, image stitching 244 module may output the composite image to a modeling 246 module. As shown in FIG. 2, in some embodiments, instead of or in addition to providing the composite image to modeling 246 module, image stitching 244 module may store the composite image to a repository 270, for example to a digital asset repository 270 maintained by another system or service such as a digital asset repository system or service. In some embodiments, instead of or in addition to providing the composite image to modeling 246 module, the composite images output by image stitching 244 module may be presented to a user as 2D images via a client interface, for example as illustrated in FIG. 6B.

In some embodiments, modeling 246 module of the virtual world generation engine 240 may generate a 2D or 3D model of the scene, or of an object in the scene, from the composite image generated by image stitching 244 module. One or more of various automated 2D or 3D reconstruction or modeling techniques may be used to generate models and graphics information from the content of the composite image and/or component images. The modeling 246 module may generate and output graphics data including but not limited to a generated 2D or 3D model.

In some embodiments, modeling 246 module may output graphics data including but not limited to the generated model to video processing module(s) 260 to be rendered into video. In some embodiments, instead of or in addition to providing the graphics data to a video processing module 260, modeling 246 module may store the generated graphics data to a repository 270, for example to a digital asset repository 270 maintained by another system or service such as a digital asset repository system or service.

As shown in FIG. 2, in some embodiments, video generation functionality may be implemented as or by video processing modules 260 on a provider network 210. In some embodiments, the video processing modules 260 may include one or more components, modules, or layers such as a rendering 262 module and a video streaming 264 module.

In some embodiments, the video processing modules 260 may include a video control module 268.

In some embodiments, rendering 262 module may apply one or more 3D-to-2D rendering techniques to render 2D video content or frames at least in part from 3D graphics data generated by modeling 246 module. In some embodiments, rendering 262 module may combine or merge other graphics data obtained from other sources (e.g., from a digital asset repository 270) with the graphics data received from the virtual world generation engine 240 to generate video content or frames. In some embodiments, rendering 262 module may combine or merge video content generated from the graphics data received from the virtual world generation engine 240 with video received from one or more video sources 280 to generate video content or frames.

A video streaming 264 module may stream the rendered video content or frames to one or more clients 290. In some embodiments, video streaming 264 module may be implemented according to a streaming service and/or protocol, for example as illustrated in FIGS. 13 and 14.

In some embodiments, virtual world generation and video generation may be performed at least in part according to input/interactions received from client 290 devices. For example, virtual world generation engine 240 and video processing modules 260 may be implemented by a video system such as a real-time video exploration (RVE) system or game system that generates video content at least in part in response to user interactions with video content as shown in FIG. 3. In some embodiments, video control module 268 may receive and process user inputs and interactions with video content received from client(s) 290, and may direct rendering module 262 in combining and rendering graphics and video content from different sources (e.g., engine 240, repository 270, and video sources 280) according to the user interactions. In some embodiments, video control module 268 may also control or direct operations of virtual world generation engine 240, for example via virtual world generation control module 248, according to the user interactions. For example, video control module 268 may signal virtual world generation control module 248 to indicate a specific real-world scene or object, or portion of a scene or object, for which a 2D or 3D model is required. Virtual world generation control module 248 may then signal image acquisition 242 module, which may acquire images(s) for the scene from image collection module 220. Virtual world generation control module 248 may also direct image stitching 244 module in selecting and merging particular acquired images to generate views of a specified scene, and/or modeling 246 module in generating 2D or 3D graphics data from the composite images generated by image stitching 244 module.

In some embodiments, virtual world generation engine 240 and video processing modules 260 may be implemented by a video system such as a real-time video exploration (RVE) system or game system that generates video content at least in part in response to user interactions with video content as shown in FIG. 3. In some embodiments, the video system may be a network-based video playback or game system that leverages network-based computation and storage resources to support tens, hundreds, thousands, or even more client devices, with many video streams being provided to different users via different client devices at the same time. In at least some embodiments, the video system may be implemented according to a service provider's provider network technology and environment, for example as illustrated in FIGS. 13 through 15, that may implement one or more services that can be leveraged to dynamically and flexibly provide network-based computation and/or storage resources to support fluctuations in demand from the user base. In addition, the provider network technology may provide a streaming service as illustrated in FIGS. 13 and 14 that may be leveraged to support video streaming to hundreds, thousands, or even more client devices. In at least some embodiments, to support increased demand, additional computation and/or storage resources to implement additional instances of one or more of the modules of the video system (e.g., image acquisition 242 module, image stitching 244 module, modeling 246 module, rendering 262 module and video streaming 264 module) or other components not shown (e.g., load balancers, routers, etc.) may be allocated, configured, "spun up", and brought on line. When demand decreases, resources that are no longer needed can be "spun down" and deallocated. In addition, the provider network technology may provide network-based computation resources specifically provisioned to support particular functionality of the video system, such as image stitching, 2D or 3D modeling, and rendering. The computational power and flexibility available through the network-based computation resources, as well as the video streaming capabilities provided through a streaming protocol, may allow the video system to dynamically generate and provide different video content to many different users on many different client devices in real time.

FIG. 7 is a high-level flowchart of a method for dynamically generating and rendering video content from image collections and streaming the video content to client devices in response to user interactions with video content that may be implemented by a video system as described in reference to FIG. 2, according to at least some embodiments. As indicated at 702 of FIG. 7, virtual world generation engine 240 may obtain images for a 2D or 3D model according to user interactions with video content. The images may, for example, be obtained from an image collection 220 module or service. As indicated at 704 of FIG. 7, virtual world generation engine 240 may match and stitch two or more of the images according to the user interactions with video content to generate composite image(s). As indicated at 706 of FIG. 7, virtual world generation engine 240 may generate 2D or 3D graphics data from the composite image(s). As indicated at 708 of FIG. 7, video processing module(s) 260 may render new video content and/or video frame(s) from the graphics data. As indicated at 710 of FIG. 7, video processing module(s) 260 may stream video to the client device(s) that includes the new video content. At 712, if there are more or additional user interactions with the video/scene, then, as indicated at 714, the method may return to element 704 to generate additional 2D or 3D graphics data to be rendered, if no additional images are needed, or to element 702 to obtain additional images for processing as needed.

FIG. 3 illustrates a video system that includes a virtual world generation engine or module, according to at least some embodiments. In some embodiments, a video system 300 may be a real-time video exploration (RVE) system that may include one or more video processing modules 302 that play back video 312 from one or more sources 310 to one or more clients 390, receive user input/interactions 322 with video content within scenes being explored from respective clients 390, responsively generate or update 2D or 3D models from graphics data 314 obtained from one or more sources 310 in response to the user input/interactions 322 exploring the video content within the scenes, render new video content for the scenes at least in part from the generated models, and deliver the newly rendered video content (and audio, if present) to the respective clients 390 as video 324. Thus, rather than just viewing a pre-rendered scene in a video 312, a user may step into and explore the scene from different angles, wander around the scene at will within the scope of the modeled world, discover hidden objects and/or parts of the scene that are not visible in the original video 312, and explore, manipulate, and modify video content (e.g., rendered objects) within the modeled world.

As shown in FIG. 3, in some embodiments, a video system 300 may include a virtual world generation engine 340 that may be used to dynamically generate virtual worlds for selected scenes. For example, client interaction 322 may indicate that a user wants to further explore a real-world scene or content of a scene, for example the Grand Canyon or the Eiffel Tower. The virtual world generation engine 340 may be requested 342 to generate a 2D or 3D model of the scene that the user can view and explore. The virtual world generation engine 340 may obtain images and data 332 related to the scene or object from an image collection 330 module or service, generate graphics data from the obtained images, and provide the graphics data 344A to the video processing module(s) 302. The video processing module(s) 302 may then render new video content at least in part from graphics data 344A, and deliver the newly rendered video content to the respective clients 390 as video 324. The process may be interactive; that is, additional user interactions may be received indicating interactions with the new video content, new graphics data 344A may be generated and provided in response to the additional user interactions, and so on, until the user has finished exploring the scene.

In some embodiments, virtual world generation engine 340 may also store at least some graphics data 344B to a data source 310. In some embodiments, video processing module(s) 302 may access the graphics data 344B from the data source as part of graphics data 314. Thus, in some embodiments, instead of or in addition to providing graphics data 344A to video processing module(s) 302 for real-time applications in video, virtual world generation engine 340 may store graphics data 344B to a data source 310 for later access by video processing module(s) 302 or possibly by other applications or systems.

The user interactions 322 for which requests 342 are generated may, for example, include interactions exploring, manipulating, and/or modifying video content within virtual worlds as described herein, for example according to methods as illustrated in FIGS. 9 through 12. The user interactions 322 may include, but are not limited to, interactions navigating through, exploring, and viewing different parts of a modeled world and interactions viewing, exploring, manipulating, and/or modifying rendered objects or other video content within the modeled world.

Figure 4:
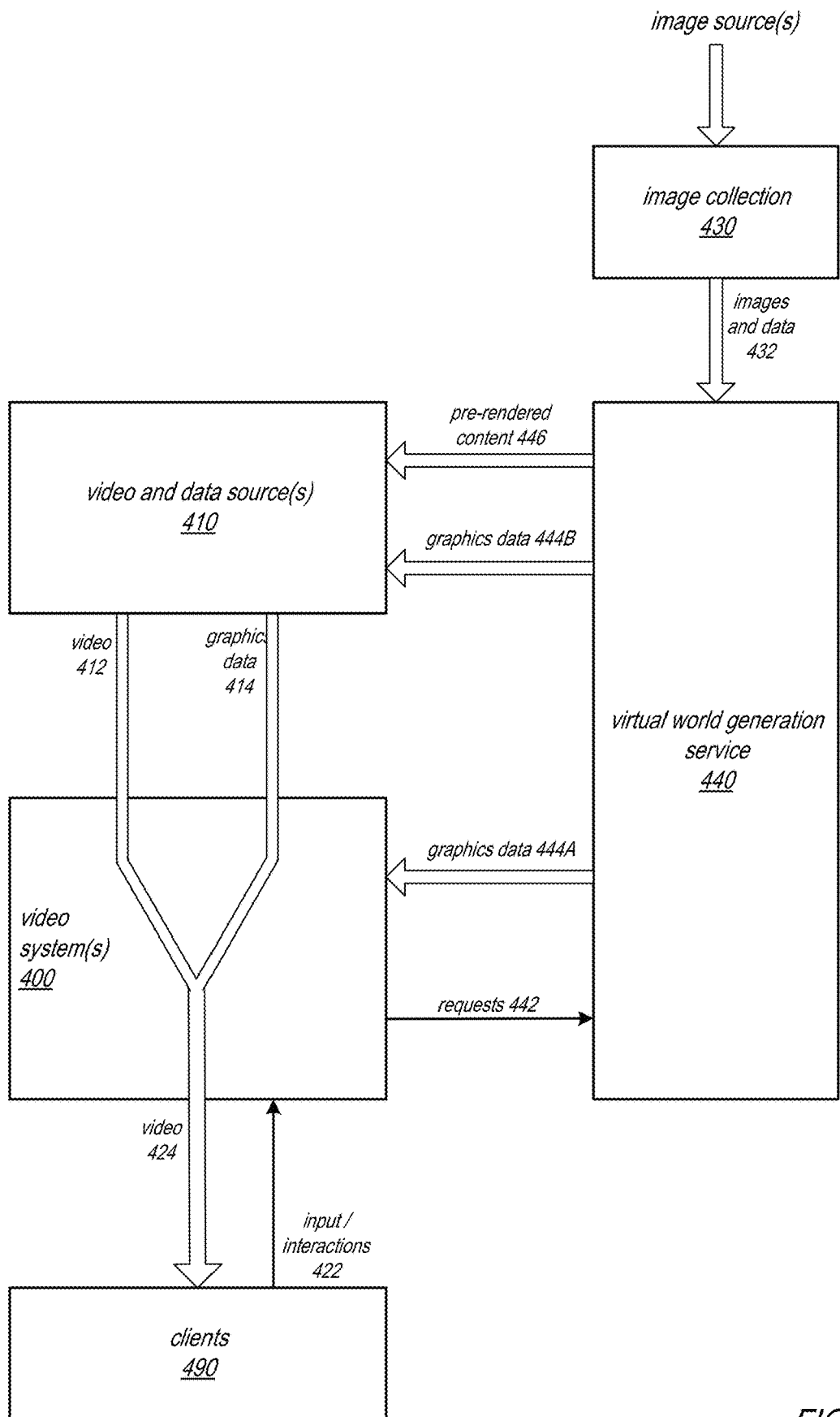
FIG. 4 illustrates a virtual world generation service, according to at least some embodiments.

While FIG. 3 shows the virtual world generation engine 340 as a component of the video system 300, in some embodiments, the virtual world generation engine 340 may be implemented externally to the video system 300, for example as a virtual world generation service 440 as illustrated in FIG. 4.

While FIG. 3 illustrates the virtual world generation engine 340 in reference to a real-time video exploration (RVE) system in which users can interactively explore content of pre-recorded video such as movies and television show, embodiments may also be applied within gaming environments to dynamically generate virtual worlds from collections of digital photographs or video frames. Referring to FIG. 3, video system 300 may be a game system, video processing module(s) 302 may be or may include a game engine, client(s) 390 may be game clients, and users may be players or game players.

Virtual World Generation Service

While 4 shows a virtual world generation module as a component of a video system (e.g., an RVE system or game system), in some embodiments, at least part of the virtual world generation functionality may be implemented externally to the video systems for which virtual worlds are generated, for example as or by a virtual world generation service. FIG. 4 illustrates a virtual world generation service 440 and environment, according to at least some embodiments.

As shown in FIG. 4, the environment may include one or more video systems 400. The video systems 400 may, for example, include one or more RVE systems and/or one or more game systems. Each video system 400 may obtain video 412 and/or graphics data 414 from one or more video and data sources 410, and process the video 412 and/or graphics data 414 to generate video 424 output that may, for example, be streamed to various client 490 devices. Each video system 400 may receive input from one or more client 490 devices indicating user interactions 422 with video content on the respective devices. The user interactions may, for example, include interactions exploring, manipulating, and/or modifying video content within virtual worlds generated by the video system(s) 400 and displayed on respective client 490 devices. The video system(s) 400 may render and send new video content to the client 490 device(s) based at least in part on the user interactions with the video content.

A virtual world generation service 440 may be accessed by video system(s) 400 to dynamically generate virtual worlds for selected scenes. The virtual world generation service 440 may receive requests 442 to generate 2D or 3D models of scenes from video system(s) 400, obtain images and data 432 related to the scenes from an image collection 430 module or service, generate 2D or 3D graphics data from the obtained images, and provide the graphics data 444A to respective video systems 400. The video systems 400 may then render new video content at least in part from graphics data 444A, and deliver the newly rendered video content to the respective clients 490 as video 424.

In some embodiments, virtual world generation service 440 may also store at least some graphics data 444B to a data source 410. In some embodiments, video systems 400 may access the graphics data 444B from the data source as part of graphics data 414. Thus, in some embodiments, instead of or in addition to providing graphics data 444A to video systems 400 for real-time applications in video, virtual world generation service 440 may store graphics data 444B to a data source 410 for later access by video systems 400 or possibly by other applications or systems.

In some embodiments, virtual world generation service 440 may implement a rendering module or component, and may perform at least some rendering of generated graphics data 444 to produce pre-rendered content 446. In some embodiments, the pre-rendered content 446 may be stored to video and data source(s) 410, from where the pre-rendered content 446 may be obtained by video system(s) 400 to be merged into or combined with video 412, graphics data 414, and/or graphics data 444A to generate video 424 content as output. In some embodiments, instead of or in addition to storing the pre-rendered content 446 to video and data source(s) 410, at least some pre-rendered content 446 may be provided directly to video system(s) 400.

In some embodiments, the virtual world generation service 440 may implement one or more application programming interfaces (APIs) via which video system(s) 400 may send requests 842, and via which graphics data 444 and/or pre-rendered content 446 may be sent to video system(s) 400 and/or video and data sources 410. In some embodiments, the virtual world generation service 440 may be implemented as a service on a provider network, for example a provider network as illustrated in FIG. 13 or 15.

Example Real-Time Video Exploration (RVE) System and Methods

This section describes example embodiments of real-time video exploration (RVE) systems and environments in which embodiments of virtual world generation methods and modules as described herein may be implemented to dynamically generate 2D or 3D modeled worlds from collections of images. Video content may be dynamically rendered by an RVE system from the 2D or 3D modeled worlds and streamed to client device(s).

Various embodiments of methods and apparatus for generating, presenting, and exploring two-dimensional (2D) or three-dimensional (3D) modeled worlds from within pre-rendered video are described. Video, including but not limited to movies, may be produced using 2D or 3D computer graphics techniques to generate 2D or 3D modeled worlds for scenes and render representations of the modeled worlds from selected camera viewpoints as output. In video production, scene content (e.g., objects, textures, colors, backgrounds, etc.) is determined for each scene, a camera viewpoint or perspective is pre-selected for each scene, the scenes (each representing a 2D or 3D world) are generated and rendered according to computer graphics techniques, and the final rendered output video (e.g., a movie) includes a representation of the modeled worlds, with each frame of each scene rendered and shown from a fixed, pre-selected camera viewpoint and angle, and with fixed, predetermined content. Thus, conventionally, a consumer of pre-rendered video (e.g., a movie) views the scenes in the movie from pre-selected camera viewpoints and angles, and with pre-determined content.

The graphics data used in generating videos (e.g., movies) may include rich 2D and/or 3D content that is not presented to the viewer in conventional video, as the viewer views the scenes in the video rendered from perspectives that were pre-selected by the director, and all viewers of the video view the scenes from the same perspectives. However, the graphics data may be available or may be made available, and if not available at least some 2D or 3D data may be generated from the original video. For example, 3D data may be generated from 2D video content using various 2D-to-3D modeling techniques.

Figure 8:
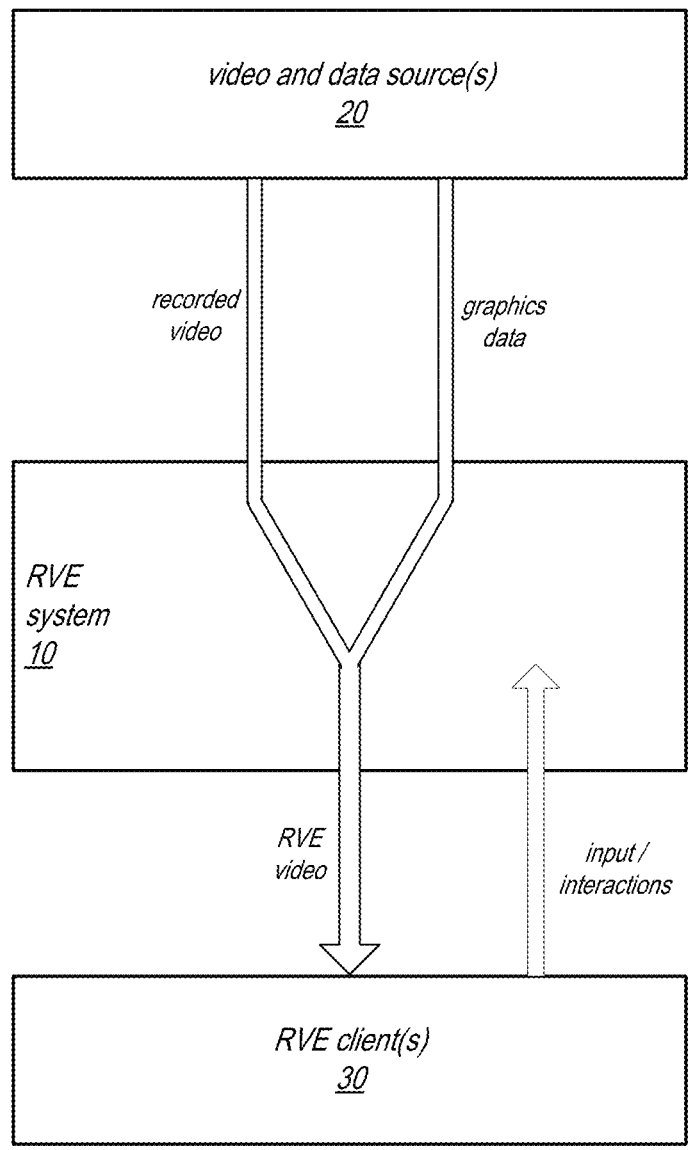
FIG. 8 is a high-level illustration of a real-time video exploration (RVE) system, according to at least some embodiments.

Embodiments of real-time video exploration (RVE) methods and systems are described that may leverage this graphics data to enable interactive exploration of 2D or 3D modeled worlds from scenes in pre-rendered, pre-recorded video by generating and rendering new video content in real time at least in part from the graphics data. FIG. 8 is a high-level illustration of a real-time video exploration (RVE) system 10, according to at least some embodiments. Embodiments of an RVE system 10 may, for example, allow a video consumer (also referred to herein as a user or viewer), via an RVE client 30, to "step into" a scene in a video (e.g., a movie) to explore the rest of the modeled world "behind the scenes" via a user-controlled, free-roaming "camera" that allows the user to change viewing positions and angles in the modeled world.

In at least some embodiments, the RVE system 10 may play back video from one or more sources 20 to one or more RVE clients 30, receive user input/interactions within scenes being explored from respective RVE clients 30, responsively generate or update models from graphics data obtained from one or more sources 20 in response to the user input/interactions exploring the scenes, render new video content of the scenes at least in part from the models, and deliver the newly rendered video content (and audio, if present) to the respective RVE clients 30 as RVE video. Thus, rather than just viewing a pre-rendered scene in a movie from a perspective that was pre-selected by a director, a user may step into and explore the scene from different angles, wander around the scene at will within the scope of the modeled world, and discover hidden objects and/or parts of the scene that are not visible in the original video as recorded. The RVE video that is output to the client(s) 30 by RVE system 10 is a video stream that has been processed and rendered according to two inputs, one input being the user's exploratory inputs, the second input being the recorded video and/or graphics data obtained from source(s) 20. In at least some embodiments, RVE system 10 may provide one or more application programming interfaces (APIs) for receiving input from and sending output to RVE client(s) 30.

Figure 12:
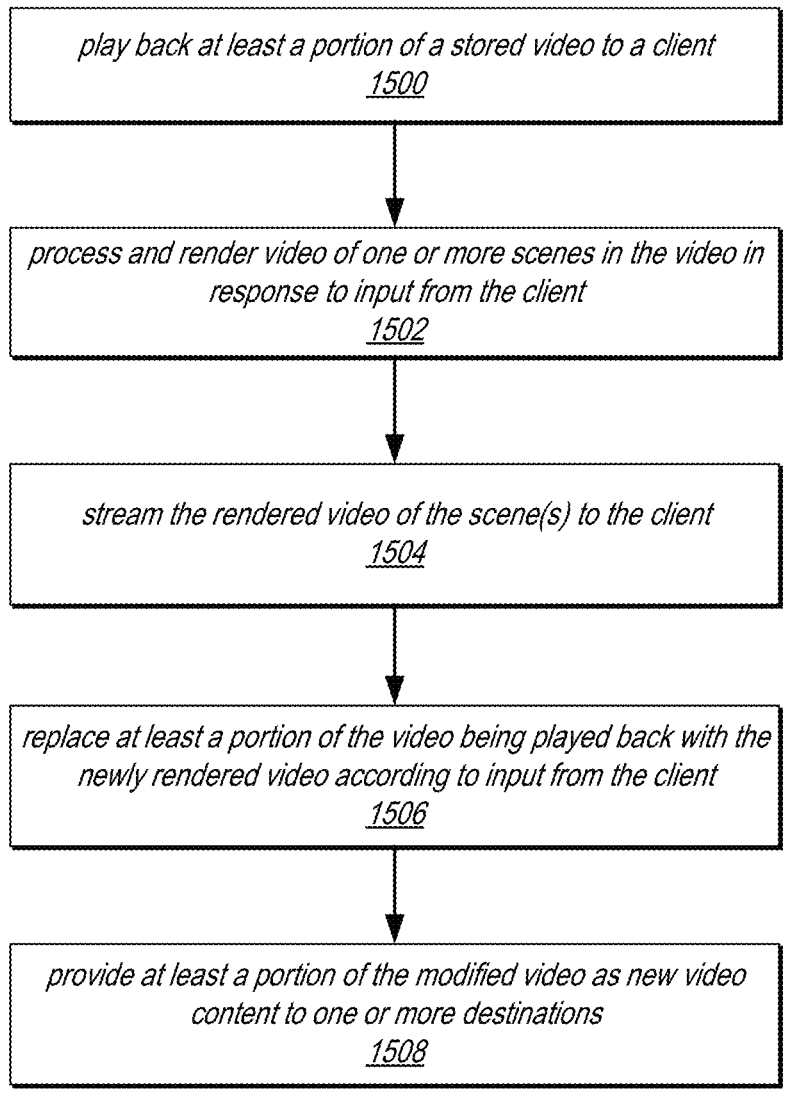
FIG. 12 is a flowchart of a method for rendering and storing new video content during playback of pre-recorded video, according to at least some embodiments.

Since exploring and rendering a modeled world is computationally expensive, at least some embodiments of an RVE system 10 may leverage network-based computation resources and services (e.g., a streaming service) to receive user input/interactions within a scene being explored from an RVE client 30 device, responsively generate or update a model from the 2D or 3D data in response to the user input/interactions, render new video content of the scene from the model, and deliver the newly rendered video content (and in some cases also audio) as a video stream to the client device in real-time or near-real-time and with low latency. The computational power available through the network-based computation resources, as well as the video and audio streaming capabilities provided through a streaming protocol, allows the RVE system 10 to provide low-latency responses to the user's interactions with the modeled world as viewed on the respective client device, thus providing a responsive and interactive exploratory experience to the user. FIG. 12 illustrates an example RVE system and environment in which network-based computation resources are leveraged to provide real-time, low-latency rendering and streaming of video content, according to at least some embodiments. FIG. 14 illustrates an example network-based environment in which a streaming service is used to stream rendered video to clients, according to at least some embodiments. FIG. 15 illustrates an example provider network environment in which embodiments of an RVE system as described herein may be implemented. FIG. 16 is a block diagram illustrating an example computer system that may be used in some embodiments.

In addition to allowing users to pause, step into, move through, and explore the modeled worlds of scenes in a video, at least some embodiments of an RVE system 10 may also allow users to modify the scenes, for example by adding, removing, or modifying various graphics effects such as lens effects (e.g., fisheye, zoom, filter, etc.), lighting effects (e.g., illumination, reflection, shadows, etc.), color effects (color palette, color saturation, etc.), or various simulated effects (e.g., rain, fire, smoke, dust, fog, etc.) to the scenes.

In addition to allowing users to pause, step into, move through, explore, and even modify the modeled worlds of scenes in a video, at least some embodiments of an RVE system 10 may also allow users to discover, select, explore, and manipulate objects within the modeled worlds used to generate video content. At least some embodiments of an RVE system 10 may implement methods that allow users to view and explore in more detail the features, components, and/or accessories of selected objects that are being manipulated and explored. At least some embodiments of an RVE system 10 may implement methods that allow users to interact with interfaces of selected objects or interfaces of components of selected objects.

In addition to allowing users to explore scenes and manipulate objects within scenes, at least some embodiments of an RVE system 10 may allow users to interact with selected objects to customize or accessorize the objects. For example, a viewer can manipulate or interact with a selected object to add or remove accessories, customize the object (change color, texture, etc.), or otherwise modify the object according to the user's preferences or desires. In at least some embodiments, the RVE system 10 may provide an interface via which the user can obtain additional information for the object, customize and/or accessorize an object if and as desired, be given a price or price(s) for the object as customized/accessorized, and order or purchase the object as specified if desired.

At least some embodiments of an RVE system 10 may allow a user to create and record their own customized version of a video such as a movie, and/or to stream or broadcast a customized version of a video to one or more destinations in real time. Using embodiments, new versions of videos or portions of videos may be generated and may, for example, be stored or recorded to local or remote storage, shown to or shared with friends, or may be otherwise recorded, stored, shared, streamed, broadcast, or distributed assuming the acquisition of appropriate rights and permissions to share, distribute, or broadcast the new video content.

At least some embodiments of an RVE system 10 may leverage network-based computation resources and services to allow multiple users to simultaneously receive, explore, manipulate, and/or customize a pre-recorded video via RVE clients 30. The RVE system 10 may, for example, broadcast a video stream to multiple RVE clients 30, and users corresponding to the RVE clients 30 may each explore, manipulate, and/or customize the video as desired. Thus, at any given time, two or more users may be simultaneously exploring a given scene of a video being played back in real time, or may be simultaneously watching the scene from different perspectives or with different customizations, with the RVE system 10 interactively generating, rendering, and streaming new video to RVE clients 30 corresponding to the users according to the users' particular interactions with the video. Note that the video being played back to the RVE clients 30 may be pre-recorded video or may be new video generated by a user via one of the RVE clients 30 and broadcast "live" to one or more others of the RVE clients 30 via the RVE system 10.

While embodiments of the RVE system 10 are generally described as generating 3D models of scenes and objects and rendering video from the 3D models of scenes and 3D objects using 3D graphics techniques, embodiments may also be applied in generating and rendering 2D models and objects for video using 2D graphics techniques.

At least some embodiments of an RVE system 10 may implement a virtual world generation engine as described herein, or may access or be integrated with a virtual world generation engine as described herein. The RVE methods described in reference to RVE system 10 and RVE clients 30 may be used, for example, to pause, step into, explore, and manipulate content of video, while the virtual world generation engine may generate 2D or 3D modeled worlds or scenes from collections of images in response to the interactions with the video content. The RVE system 10 may render video content from the generated 2D or 3D modeled worlds or scenes, and stream the rendered video content to one or more of the RVE clients 30.

Figure 9:
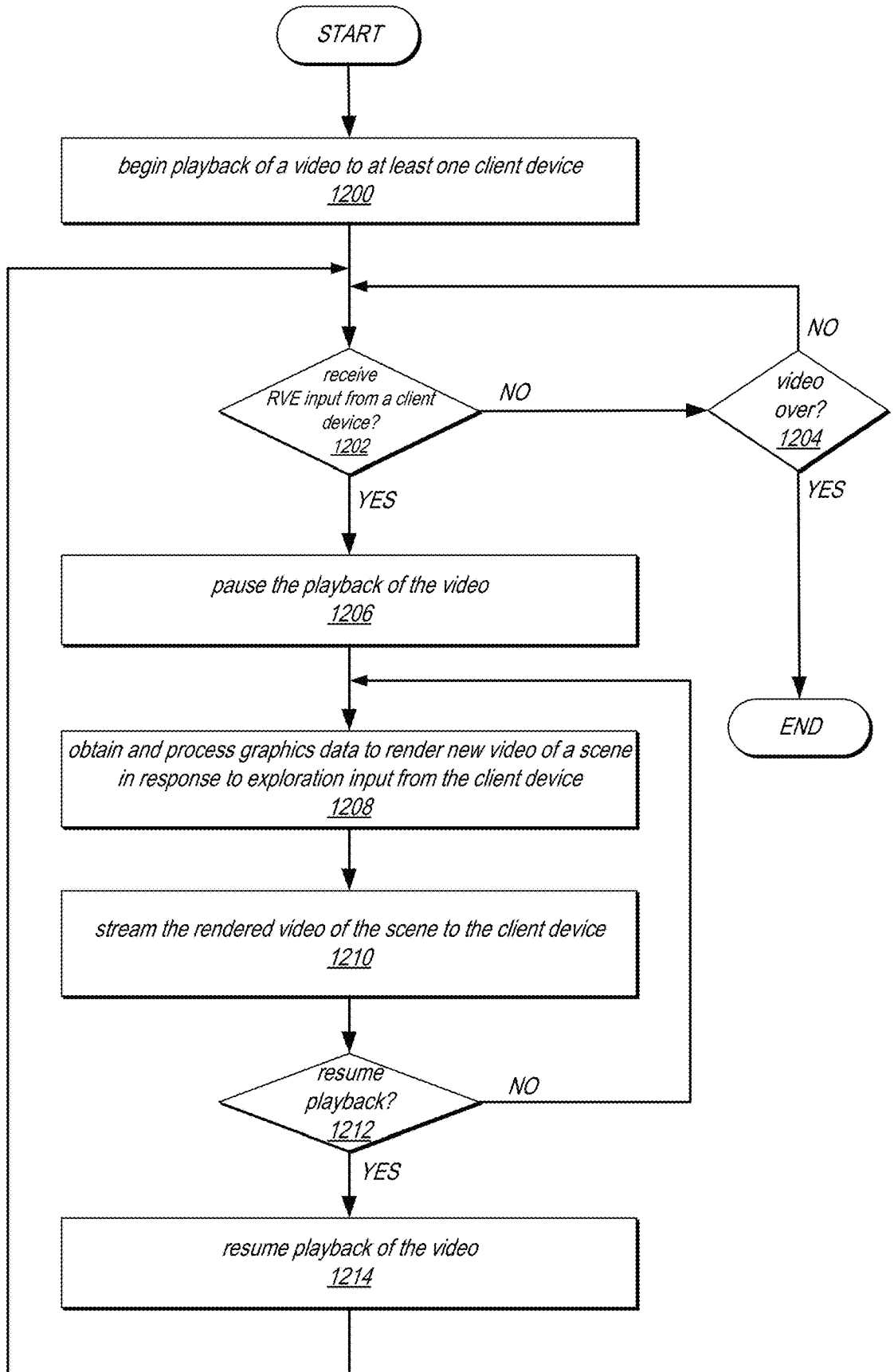
FIG. 9 is a flowchart of a method for exploring modeled worlds in real-time during playback of pre-recorded video, according to at least some embodiments.

FIG. 9 is a flowchart of a method for exploring modeled worlds in real-time during playback of pre-recorded video according to at least some embodiments, and with reference to FIG. 8. As indicated at 1200, an RVE system 10 may begin playback of a pre-recorded video to at least one client device. For example, an RVE control module of the RVE system 10 may direct a video playback module to begin playback of a selected video from a video source 20 to a client device in response to selection input received from an RVE client 30 on the client device. Alternatively, the RVE system 10 may begin playback of a pre-recorded video from a video source 20, and then receive input from one or more RVE clients 30 joining the playback to view (and possibly explore) the video content on respective client devices.

During playback of the pre-recorded video to the client device(s), additional input and interactions may be received by the RVE system 10 from an RVE client 30 on a client device. For example input may be received that indicates an RVE event in which the user pauses the pre-recorded video being played back to the client device so that the user can explore the current scene. As indicated at 1202, the RVE system 10 may continue to play back the pre-recorded video to the client device until the video is over as indicated at 1204, or until RVE input is received from the RVE client 30 that directs the RVE system 10 to pause the video. At 1202, if RVE input requesting a pause of the video is received from an RVE client 30, the RVE system 10 pauses the replay of the video to the client device at a current scene, as indicated at 1206.

As indicated at 1208, while the playback of the pre-recorded video is paused at a scene, the RVE system 10 may obtain and process 2D or 3D data to render new video of the scene in response to exploration input from the client device, and may stream the newly rendered video of the scene to the client device as indicated at 1210. In at least some embodiments, the RVE system 10 may begin generating a modeled world for the scene from the 3D data, rendering a 2D representations of the modeled world, and streaming the real-time rendered video to the respective client device in response to the pause event as indicated at 1202 and 1206. Alternatively, the RVE system 10 may begin generating a modeled world for the scene from the 2D or 3D data, rendering a 2D representations of the modeled world, and streaming the real-time rendered video to the respective client device upon receiving additional exploratory input received from the client device, for example input changing the viewing angle of the viewer in the scene, or input moving the viewer's viewpoint through the scene. In response to additional user input and interactions received from the client device indicating that the user is further exploring the scene, the RVE system 10 may render and stream new video of the scene from the modeled world according to the current user input and graphics data, for example new video rendered from a particular position and angle within the modeled world of the scene that is indicated by the user's current input to the client device. Alternatively, in some embodiments, the video may not be paused at 1206, and the method may perform elements 1208 and 1210 while the video continues playback.

In at least some embodiments, in addition to allowing users to pause, step into, move through, and explore a scene in a pre-recorded video being played back, the RVE system 10 may allow a user to modify the scene, for example by adding, removing, or modifying graphics effects such as lens effects (e.g., fisheye, zoom, etc.), lighting effects (e.g., illumination, reflection, shadows, etc.), color effects (color palette, color saturation, etc.), or various simulated effects (e.g., rain, fire, smoke, dust, fog, etc.) to the scenes.

As indicated at 1212, the RVE system 10 may continue to render and stream new video of the scene from the modeled world in response to exploratory input until input is received from the client device indicating that the user wants to resume playback of the pre-recorded video. As indicated at 1214, upon receiving resume playback input, the RVE system may resume playing back the pre-recorded video to the client device. The playback may, but does not necessarily, resume at the point where the playback was paused at 1206.

In at least some embodiments, the RVE system 10 may leverage network-based computation resources and services (e.g., a streaming service) to receive the user input/interactions with video content from an RVE client 30, responsively generate or update a model from the 2D or 3D data in response to the user input/interactions, render the new video content of the scene from the model, and deliver the newly rendered video content (and possibly also audio) to the client device in real-time or near-real-time as a video stream. The computational power available through the network-based computation resources, as well as the video and audio streaming capabilities provided through a streaming protocol, may allow the RVE system 10 to provide low-latency responses to the user's interactions with the modeled world of the scene as viewed on the client device, thus providing a responsive and interactive exploratory experience to the user.

At least some embodiments of a real-time video exploration (RVE) system may implement methods that allow users to discover, select, explore, and manipulate objects within the modeled worlds used to generate video content (e.g., scenes in movies or other video). Leveraging network-based computation resources and services and utilizing the rich 2D or 3D content and data that was used to generate and render the original, previously rendered and recorded video, an RVE system 10 may allow a viewer of a video, for example a movie, to pause and "step into" a rendered scene from the video via an RVE client 30 on a client device to discover, select, explore, and manipulate objects within the scene. For example, a viewer can pause a movie at a scene and interact with one or more rendered object(s) in a scene. The viewer may select a model of an object in the scene, pull up information on or relevant to the selected object, visually explore the object, and in general manipulate the object in various ways.

Figure 10:
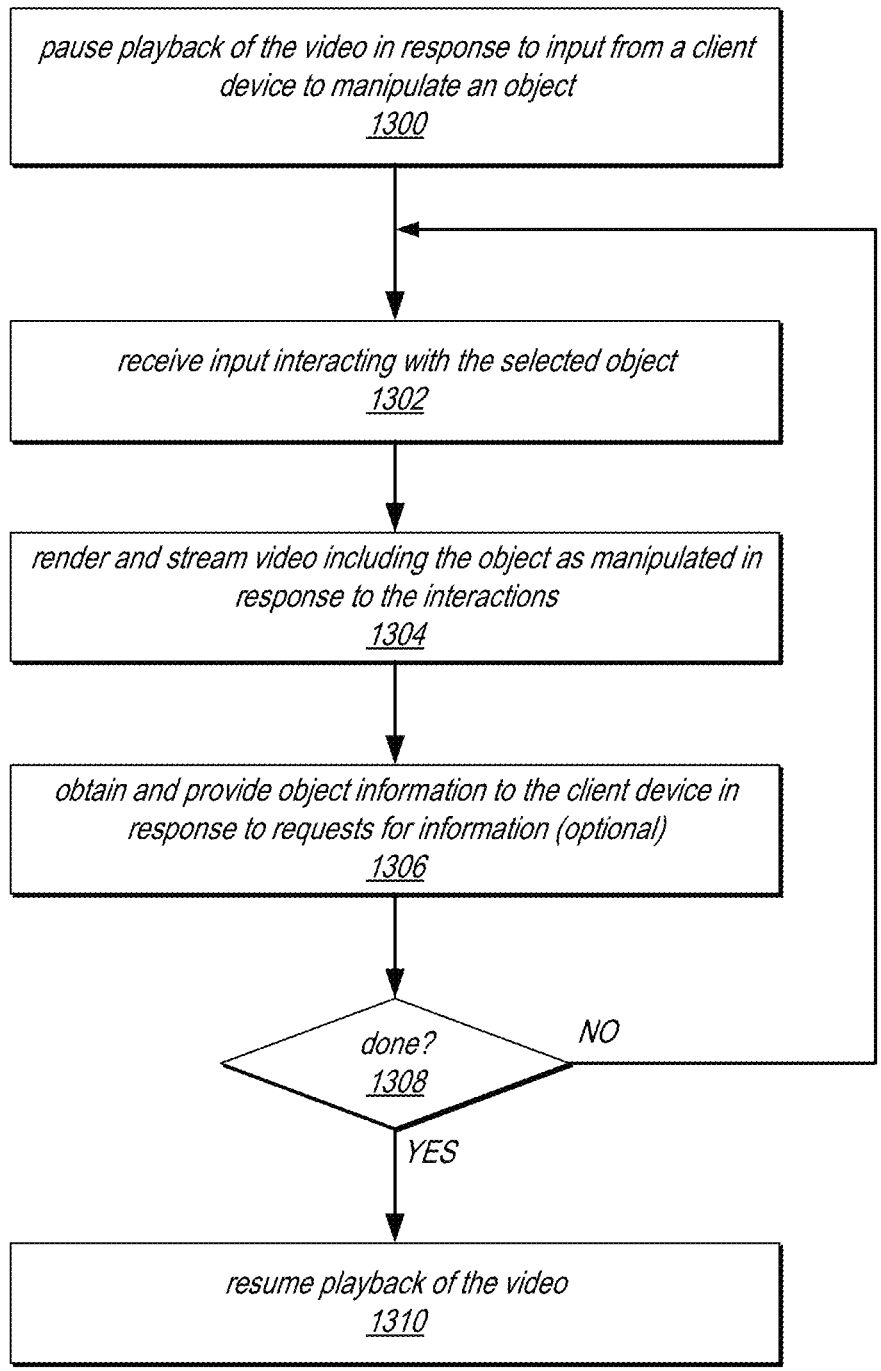
FIG. 10 is a flowchart of a method for interacting with objects and rendering new video content of the manipulated objects while exploring a video being played back, according to at least some embodiments.

FIG. 10 is a flowchart of a method for interacting with objects and rendering new video content of the manipulated objects while exploring a pre-recorded video being played back, according to at least some embodiments, and with reference to FIG. 8. As indicated at 1300, the RVE system 10 may pause playback of a pre-recorded video being played back to a client device in response to input received from the client device to manipulate an object in a scene. In at least some embodiments, the RVE system 10 may receive input from the client device selecting an object in a scene displayed on the client device. In response, the RVE system 10 may pause the pre-recorded video being played back, obtain 2D or 3D graphics data for the selected object, generate a modeled world for the scene including a new model of the object according to the obtained data, and render and stream new video of the scene to the client device.

Note that a selected object may be virtually anything that can be rendered from a 2D or 3D model. Non-limiting examples of objects that can be modeled within scenes, selected, and manipulated by embodiments include fictional or real devices or objects such as vehicles (cars, trucks, motorcycles, bicycles etc.), computing devices (smartphones tablet devices, laptop or notebook computers, etc.), entertainment devices (televisions and stereo components, game consoles, etc.), toys, sports equipment, books, magazines, CDs/albums, artwork (painting, sculptures, etc.) appliances, tools, clothes, and furniture; fictional or real plants and animals; fictional or real persons or characters; packaged or prepared foods, groceries, consumables, beverages, and so on; health care items (medicines, soap, shampoo, toothbrushes, toothpaste, etc.); and in general any living or non-living, manufactured or natural, real or fictional object, thing, or entity.

As indicated at 1302, the RVE system 10 may receive input from the client device indicating that the user is interacting with the selected object via the client device. As indicated at 1304, in response to the interactive input, the RVE system 10 may render and stream new video of the scene from the modeled world including the model of the object as manipulated or changed by the interactive input to the client device.

Non-limiting examples of manipulations of a selected object may include picking up an object, moving an object in the scene, rotating an object as if the object was held in the viewer's hands, manipulating movable parts of the object, or in general any physical manipulation of the object that can be simulated via 2D or 3D rendering techniques. Other examples of manipulations of an object may include changing the rendering of an object such as changing the lighting, texture, and/or color of the object, changing the opacity of the object so that the object is somewhat transparent, and so on. Other examples of object manipulations may include opening and closing doors in a house or on a vehicle, opening and closing drawers on furniture, opening and closing the, trunk, or other compartments on a vehicle, or in general any physical manipulation of components of an object that can be simulated via 2D or 3D rendering techniques. As just one non-limiting example, a user may step into a scene of a paused video to view a vehicle in the scene from all angles, open the doors and go inside the vehicle, open the console or glove compartment, and so on.

As indicated at 1306, optionally, the RVE system 10 may obtain and provide information for a selected object to the client device in response to a request for information. For example, in some embodiments, a user may double-tap on, right-click on, or otherwise select, an object to display a window of information about the object. As another example, in some embodiments, a user may double-tap on, or right-click on, a selected object to bring up a menu of object options, and select a "display info" option from the menu to obtain the object information.

Non-limiting examples of information on or relevant to a selected object that may be provided for a selected object may include descriptive information associated and possibly stored with the model data or with the video being played back. In addition, the information may include, or may include links to, informational or descriptive web pages, advertisements, manufacturer or dealer web sites, reviews, BLOGs, fan sites, and so on. In general, the information that may be made available for a given object may include any relevant information that is stored with the model data for the object or with the video, and/or relevant information from various other sources such as web pages or web sites. Note that an "object options" list may be displayed may include various options for manipulating a selected object, for example options to change color, texture, or other rendered features of the selected object. At least some of these options may be specific to the type of object.

As indicated at 1308, the RVE system 10 may continue to render and stream new video of the scene in response to interactive input with object(s) in the scene. In at least some embodiments, the RVE system 10 may continue to render and stream new video of the scene until input is received from the client device indicating that the user wants to resume playback of the pre-recorded video. As indicated at 1310, upon receiving resume playback input, the RVE system may resume playing back the pre-recorded video to the client device. The playback may, but does not necessarily, resume at the point where the playback was paused at 1300.

In some embodiments, when an object is selected for manipulation, or when particular manipulations are performed on the selected object by the user, the RVE system 10 may access additional and/or different 2D or 3D graphics applications and/or apply additional or different 2D or 3D graphics techniques than were originally used to generate and render the object in the scene of the video being played back, and may render the object for exploration and manipulations according to the different applications and/or techniques. For example, the RVE system 10 may use additional or different techniques to add or improve texture and/or illumination for an object being rendered for exploration and manipulation by the user.

In some embodiments, when an object is selected for manipulation, or when particular manipulations are performed on the selected object by the user, the RVE system 10 may access a different model of the object than the model that was originally used to generate and render the object in the scene of the video being played back, and may render a 2D or 3D representation of the object from the different model for exploration and manipulation by the user. The different model may be a more detailed and richer model of the object than the one originally used to render the scene, and thus may provide finer detail and a finer level of manipulation of the object than would the less detailed model. As just one non-limiting example, a user can step into a scene of a paused video to view, select, and explore a vehicle in the scene. In response to selection of the vehicle for exploration and/or manipulation, the RVE system 10 may go to the vehicle's manufacturer site or to some other external source to access detailed 2D or 3D model data for the vehicle, which may then be rendered to provide the more detailed model of the vehicle to the user rather than the simpler, less detailed, and possibly less current or up-to-date model that was used in originally rendering the video.

In addition, at least some embodiments of an RVE system 10 may implement methods that allow users to view and explore in more detail the features, components, and/or accessories of selected objects that are being manipulated and explored. For example, a user may be allowed to zoom in on a selected object to view features, components, and/or accessories of the selected object in greater detail. As simple, non-limiting examples, a viewer may zoom in on a bookshelf to view titles of books, or zoom in on a table to view covers of magazines or newspapers on the table. As another non-limiting example, a viewer may select and zoom in on an object such as a notepad, screen, or letter to view the contents in greater detail, and perhaps even to read text rendered on the object. As another non-limiting example, a computing device that is rendered in the background of a scene and thus not shown in great detail may be selected, manipulated, and zoomed in on to view fine details on the device's screen or of the device's accessories and interface components such as buttons, switches, ports, and keyboards, or even model or part numbers. As another non-limiting example, an automobile that is rendered in the background of a scene and thus not shown in great detail may be selected, manipulated, and zoomed in on to view fine details of the outside of the automobile. In addition, the viewer may open the door and enter the vehicle to view interior components and accessories such as consoles, navigation/GPS systems, audio equipment, seats, upholstery, and so on, or open the hood of the vehicle to view the engine compartment.

In addition to allowing users to select and manipulate objects in a scene as described above, at least some embodiments of an RVE system 10 may implement methods that allow users to interact with interfaces of selected objects or interfaces of components of selected objects. As an example of a device and interactions with a device that may be simulated by RVE system 10, a viewer may be able to select a rendered object representing a computing or communications device such as a cell phone, smart phone, tablet or pad device, or laptop computer, and interact with the rendered interface of the device to simulate actual operations of the device. As another example of a device and interactions with a device that may be simulated by RVE system 10, a user may enter an automobile rendered on the client device and simulate operations of a navigation/GPS system in the automobile's console via the rendered representation of the navigation/GPS system's interface. The rendered object may respond appropriately to the user's interactions, for example by appropriately updating a touchscreen in response to a swipe or tap event. Reactions of a rendered object in response to the user's interactions via the rendered interface may, for example, be simulated by the RVE system 10 according to the object type and object data, or may be programmed, stored with, and accessed from the object's 2D or 3D model data or other object information.

In at least some embodiments, an RVE system 10 may leverage network-based computation resources and services (e.g., a streaming service) to receive the user's manipulations of objects in scenes on a client device, responsively generate or update models of the scenes with modified renderings of the manipulated objects in response to the user input, render new video of the scenes, and deliver the newly rendered video to the client device in real-time or near-real-time as a video stream. The computational power available through the network-based computation resources, as well as the video and audio streaming capabilities provided through a streaming protocol, may allow the RVE system 10 to provide low-latency responses to the user's interactions with the objects in a scene, thus providing responsive and interactive manipulations of the objects to the user.

At least some embodiments of a real-time video exploration (RVE) system 10 may implement methods that allow users to interact with selected objects to customize or accessorize the objects. Leveraging network-based computation resources and services and utilizing 2D or 3D data for rendered objects in a video, an RVE system 10 may allow a viewer of the video, for example a movie, to pause and "step into" a rendered scene from the video via an RVE client 30 on a client device to discover, select, explore, and manipulate objects within the scene. In addition, for rendered objects in a scene that can be accessorized or customized with options, the viewer can manipulate or interact with a selected object to add or remove accessories, customize the object (change color, texture, etc.), or otherwise modify the object according to the user's preferences or desires. As a non-limiting example, a user may interact with a rendering of an automobile of a scene to accessorize or customize the car. For example, the user can change the exterior color, change the interior, change the car from a hardtop to a convertible, and add, remove, or replace accessories such as navigation/GPS systems, audio systems, special wheels and tires, and so on. In at least some embodiments, and for at least some objects, the RVE system 10 may also facilitate pricing, purchasing, or ordering of an object (e.g., a car) as accessorized or customized by the user via an interface on the client device.

Since the modifications to an object are done in a dynamically rendered scene/environment, the viewer can customize and/or accessorize an object such as an automobile and then view the customized object as rendered in the world of the scene, with lighting, background, and so on fully rendered for the customized object. In at least some embodiments, the user-modified object may be left in the scene when the video is resumed, and the object as it appears in the original video in this and other scenes may be replaced with the rendering of the user's modified version of the object. Using an automobile as an example, the viewer may customize a car, for example by changing it from red to blue, or from a hardtop to a convertible, and then view the customized car in the modeled world of the scene, or even have the customized car used in the rest of the video once resumed.

In at least some embodiments of an RVE system 10, the ability to customize and/or accessorize objects may, for at least some objects, be linked to external sources, for example manufacturer, dealer, and/or distributor information and website(s). The RVE system 10 may provide an interface, or may invoke an external interface provided by the manufacturer/dealer/distributor, via which the user can customize and/or accessorize a selected object if and as desired (e.g., an automobile, a computing device, an entertainment system, etc.), be given a price or price(s) for the object as customized/accessorized, and even order or purchase the object as specified if desired.

Figure 11:
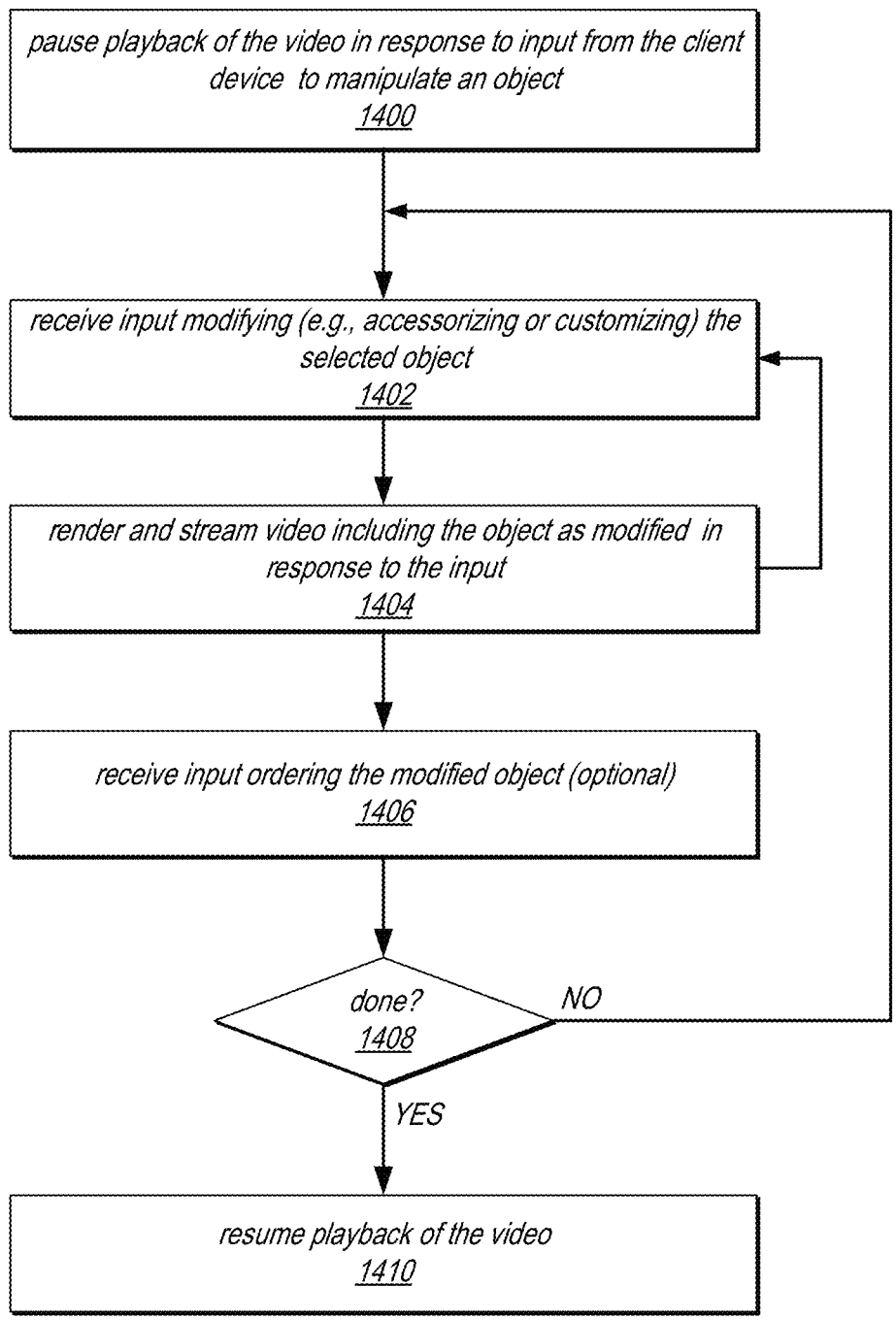
FIG. 11 is a flowchart of a method for modifying and ordering objects while exploring a video being played back, according to at least some embodiments.

FIG. 11 is a flowchart of a method for modifying, and optionally ordering, objects while exploring a video being played back, according to at least some embodiments, and with reference to FIG. 8. As indicated at 1400, the RVE system 10 may pause playback of a pre-recorded video being played back to a client device in response to input received from the client device to manipulate an object in a scene. In at least some embodiments, the RVE system 10 may receive input from the client device selecting an object in a scene displayed on the client device. In response, the RVE system 10 may pause the pre-recorded video being played back, obtain 2D or 3D data for the selected object, generate a modeled world for the scene including a new model of the object according to the obtained data, and render and stream new video of the scene to the client device.

As indicated at 1402, the RVE system 10 may receive input from the client device indicating that the user is interacting with the selected object via the device to modify (e.g., accessorize or customize) the selected object. In response, the RVE system 10 may obtain additional 2D or 3D data for accessorizing or modifying the selected object, and generate a new modeled world for the scene including a new model of the object according to the modifications specified by the user input. As indicated at 1404, the RVE system 10 may render and stream new video of the scene from the modeled world including the model of the object as modified by the input to the client device.

As shown at 1406, optionally, the RVE system 10 may receive additional input from the client device requesting additional information about the object as modified (e.g., pricing, availability, vendors, dealers, etc.), and/or additional information indicating that the user wants to purchase or order the object as modified (or as originally rendered, if desired). In at least some embodiments, in response to requests for additional information, the RVE system 10 may provide additional object information (e.g., websites, links, emails, documents, advertisements, pricing, reviews, etc.) to the user via client device. In at least some embodiments, in response to a request to order or purchase an item, the RVE system 10 may provide a name, location, URL, link, email address, phone number, and/or other information indicating one or more online or brick-and-mortar sources for ordering or purchasing the object. In some embodiments, the RVE system 10 may provide a purchasing interface via which the user can order the object as modified.

As indicated at 1408, the RVE system 10 may continue to render and stream new video of the scene in response to interactions with object(s) in the scene. In at least some embodiments, the RVE system 10 may continue to render and stream new video of the scene until input is received from the client device indicating that the user wants to resume playback of the pre-recorded video. As indicated at 1410, upon receiving resume playback input, the RVE system may resume playing back the pre-recorded video to the client device. The playback may, but does not necessarily, resume at the point where the playback was paused at 1400.

At least some embodiments of a real-time video exploration (RVE) system 10 may allow a user to generate their own customized version of a video such as a movie. The generated video may be recorded for later playback, or may be streamed or broadcast "live" to other endpoints or viewers. FIG. 12 is a flowchart of a method for rendering and storing new video content during playback of pre-recorded video, according to at least some embodiments, and with reference to FIG. 8. As indicated at 1500, an RVE system 10 may play back at least a portion of a pre-recorded video to an RVE client 30. As indicated at 1502, the RVE system 10 may process and render video of one or more scenes in the video in response to input from the RVE client 30. For example, in at least some embodiments, a user may pause a video being replayed, change the viewing angle and/or viewing position for the scene, and re-render the scene or a portion thereof using the modified viewing angle and/or position, for example using a method as described in FIG. 9. As another example, the user may manipulate, modify, customize, accessorize and/or rearrange objects in one or more scenes, for example as described in FIGS. 10 and 11. Note that one or more of these methods, or combinations of two or more of these methods, may be used to modify a given scene or portions of a scene. As indicated at 1504, the RVE system 10 may stream the newly rendered video of the scene to the RVE client 30. As indicated at 1506, at least a portion of the video being played back may be replaced with the newly rendered video according to input from the RVE client 30. For example, one or more scenes in the original video may be replaced with newly rendered scenes recorded from modified perspectives and/or including modified content to generate a new version of the original video. As indicated at 1508, at least a portion of the modified video may be provided to one or more video destinations (e.g., a video or data source 20 as illustrated in FIG. 8) as new video content. New versions of videos or portions of videos so produced may, for example, be recorded or stored to local or remote storage, shown to or shared with friends, or may be otherwise stored, shared, streamed, broadcast, or distributed assuming the acquisition of appropriate rights and permissions to share or distribute the new video content.

Example Real-Time Video Explorer (RVE) Network Environments

Embodiments of real-time video explorer (RVE) systems that implement one or more of the various methods as described herein may be implemented in the context of a service provider that provides virtualized resources (e.g., virtualized computing resources, virtualized storage resources, virtualized database (DB) resources, etc.) on a provider network to clients of the service provider, for example as illustrated in FIG. 13. Virtualized resource instances on the provider network 2500 may be provisioned via one or more provider network services 2502 and may be rented or leased to clients of the service provider, for example to an RVE system provider 2590 that implements RVE system 2510 on provider network 2502. At least some of the resource instances on the provider network 2500 may be computing resources 2522 implemented according to hardware virtualization technology that enables multiple operating systems to run concurrently on a host computer, i.e. as virtual machines (VMs) on the host. Other resource instances (e.g., storage resources 2552) may be implemented according to one or more storage virtualization technologies that provide flexible storage capacity of various types or classes of storage to clients of the provider network. Other resource instances (e.g., database (DB) resources 2554) may be implemented according to other technologies.

In at least some embodiments, the provider network 2500, via the services 2502, may enable the provisioning of logically isolated sections of the provider network 2500 to particular clients of the service provider as client private networks on the provider network 2500. At least some of a client's resources instances on the provider network 2500 may be provisioned in the client's private network. For example, in FIG. 13, RVE system 2510 may be implemented as or in a private network implementation of RVE system provider 2590 that is provisioned on provider network 2500 via one or more of the services 2502.

The provider network 2500, via services 2502, may provide flexible provisioning of resource instances to clients in which virtualized computing and/or storage resource instances or capacity can be automatically added to or removed from a client's configuration on the provider network 2500 in response to changes in demand or usage, thus enabling a client's implementation on the provider network 2500 to automatically scale to handle computation and/or data storage needs. For example, one or more additional computing resources 2522A, 2522B, 2522C, and/or 2522D may be automatically added to RVE system 2510 in response to an increase in the number of RVE clients 2582 accessing RVE system 2510 to play back and explore video content as described herein. If and when usage drops below a threshold, computing and data storage resources that are no longer necessary can be removed.

In at least some embodiments, RVE system provider 2590 may access one or more of services 2502 of the provider network 2500 via application programming interfaces (APIs) to the services 2502 to configure and manage an RVE system 2510 on the provider network 2500, the RVE system 2510 including multiple virtualized resource instances (e.g., computing resources 2522, storage resources 2552, DB resources 2554, etc.).

Provider network services 2502 may include but are not limited to, one or more hardware virtualization services for provisioning computing resource 2522, one or more storage virtualization services for provisioning storage resources 2552, and one or more database (DB) services for provisioning DB resources 2554. In some implementations, RVE system provider 2590 may access two or more of these provider network services 2502 via respective APIs to provision and manage respective resource instances in RVE system 2510. However, in some implementations, RVE system provider 2590 may instead access a single service (e.g., a streaming service 2504) via an API to the service 2504; this service 2504 may then interact with one or more other provider network services 2502 on behalf of the RVE system provider 2590 to provision the various resource instances in the RVE system 2510.

In some embodiments, provider network services 2502 may include a streaming service 2504 for creating, deploying, and managing data streaming applications such as an RVE system 2510 on a provider network 2500. Many consumer devices, such as personal computers, tables, and mobile phones, have hardware and/or software limitations that limit the devices' capabilities to perform 2D or 3D graphics processing and rendering of video data in real time. In at least some embodiments, a streaming service 2504 may be used to implement, configure, and manage an RVE system 2510 that leverages computation and other resources of the provider network 2500 to enable real-time, low-latency 2D or 3D graphics processing and rendering of video on provider network 2500, and that implements a streaming service interface 2520 (e.g., an application programming interface (API)) for receiving RVE client 2582 input and for streaming video content including real-time rendered video as well as pre-recorded video to respective RVE clients 2582. In at least some embodiments, the streaming service 2504 may manage, for RVE system provider 2590, the deployment, scaling, load balancing, monitoring, version management, and fault detection and recovery of the server-side RVE system 2510 logic, modules, components, and resource instances. Via the streaming service 2504, the RVE system 2510 can be dynamically scaled to handle computational and storage needs, regardless of the types and capabilities of the devices that the RVE clients 2582 are implemented on.

In at least some embodiments, at least some of the RVE clients 2582 may implement an RVE client interface 2684 as shown in FIG. 14 for communicating user input and interactions to RVE system 2510 according to the streaming service interface 2520, and for receiving and processing video streams and other content received from the streaming service interface 2520. In at least some embodiments, the streaming service 2504 may also be leveraged by the RVE system provider 2590 to develop and build RVE clients 2582 for various operating system (OS) platforms on various types of client devices (e.g., tablets, smartphones, desktop/notebook computers, etc.).

Referring to FIG. 13, in at least some embodiments, data including but not limited to video content may be streamed from the streaming service interface 2520 to the RVE client 2582 according to a streaming protocol. In at least some embodiments, data including but not limited to user input and interaction may be sent to the streaming service interface 2520 from the RVE client 2582 according to the streaming protocol. In at least some embodiments, the streaming service interface 2520 may receive video content (e.g., rendered video frames) from a video playback module (not shown) and/or from a rendering 2560 module, package the video content according to the streaming protocol, and stream the video according to the protocol to respective RVE client(s) 2582 via intermediate network 2570. In at least some embodiments, an RVE client interface 2684 of the RVE client 2582 may receive a video stream from the streaming service interface 2520, extract the video content from the streaming protocol, and forward the video to a display component of the respective client device for display.

Referring to FIG. 13, an RVE system provider 2590 may develop and deploy an RVE system 2510, leveraging one or more of services 2502 to configure and provision RVE system 2510. As shown in FIG. 13, the RVE system 2510 may include and may be implemented as multiple functional modules or components, with each module or component including one or more provider network resources. In this example, RVE system 2510 includes a streaming service interface 2520 component that includes computing resources 2522A, an RVE control module 2530 that includes computing resources 2522B, graphics processing 2540 module that includes computing resources 2522C, graphics rendering 2560 module that includes computing resources 2522D, and data storage 2550 that includes storage resources 2552 and database (DB) resources 2554. Note that an RVE system 2510 may include more or fewer components or modules, and that a given module or component may be subdivided into two or more submodules or subcomponents. Also note that two or more of the modules or components as shown can be combined; for example, graphics processing 2540 module and graphics rendering 2560 module may be combined to form a combined graphics processing and rendering module.

One or more computing resources 2522 may be provisioned and configured to implement the various modules or components of the RVE system 2510. For example streaming service interface 2520, RVE control module 2530, graphics processing 2540 module, and graphics rendering 2560 may each be implemented as or on one or more computing resources 2522. In some embodiments, two or more computing resources 2522 may be configured to implement a given module or component. For example, two or more virtual machine instances may implement an RVE control module 2530. However, in some embodiments, an instance of a given module (e.g., an instance of graphics processing 2540 module, or an instance of graphics rendering 2560 module) may be implemented as or on each of the computing resource 2522 instances shown in the module. For example, in some implementations, each computing resource 2522 instance may be a virtual machine instance that is spun up from a machine image implementing a particular module, for example a graphics processing 2540 module, that is stored on storage resource(s) 2552.

In at least some embodiments, computing resources 2522 may be specifically provisioned or configured to support particular functional components or modules of the RVE system 2510. For example, computing resources 2522C of graphics processing 2540 module and/or computing resources 2522D of graphics rendering module 2560 may be implemented on devices that include hardware support for 2D or 3D graphics functions, for example graphics processing units (GPUs). As another example, the computing resources 2522 in a given module may be fronted by a load balancer provisioned through a provider network service 2502 that performs load balancing across multiple computing resource instances 2522 in the module.

In at least some embodiments, different ones of computing resources 2522 of a given module may be configured to perform different functionalities of the module. For example, different computing resources 2522C of graphics processing 2540 module and/or different computing resources 2522D of graphics rendering module 2560 may be configured to perform different 2D or 3D graphics processing functions or apply different 2D or 3D graphics techniques. In at least some embodiments, different ones of the computing resources 2522 of graphics processing 2540 module and/or graphics rendering module 2560 may be configured with different graphics applications. As an example of using different graphics processing functions, techniques, or applications, when rendering objects for video content to be displayed, 2D or 3D data for the object may be obtained that needs to be processed according to specific functions, techniques, or applications to generate a 2D or 3D model of the object and/or to render a representation of the object for display.

Storage resources 2552 and/or DB resources 2554 may be configured and provisioned for storing, accessing, and managing RVE data including but not limited to: pre-recorded video and new video content generated using RVE system 2510; 2D or 3D data and object models, and other 2D or 3D graphics data such as textures, surfaces, and effects; user information and client device information; and information and data related to videos and video content such as information about particular objects. As noted above, storage resources 2552 may also store machine images of components or modules of RVE system 2510. In at least some embodiments, RVE data including but not limited to video, graphics data, object data, and user information may be accessed from and stored/provided to one or more sources or destinations eternal to RVE system 2510 on provider network 2500 or external to provider network 2500.

Example Streaming Service Implementation

FIG. 14 illustrates an example network-based environment in which a streaming service 2504 is used to provide rendered video and sound to RVE clients, according to at least some embodiments. In at least some embodiments, an RVE environment may include an RVE system 2600 and one or more client devices 2680. The RVE system 2600 has access to stores or other sources of pre-rendered, pre-recorded video, shown as video source(s) 2650. In at least some embodiments, the RVE system 10 may also have access to stores or other sources of data and information including but not limited to 2D or 3D graphics data and user information such as viewer profiles, shown as data source(s) 2660.

RVE system 2600 may include a front-end streaming service interface 2602 (e.g., an application programming interface (API)) for receiving input from RVE clients 2682 and streaming output to RVE clients 2682, and backend data interface(s) 2603 for storing and retrieving data including but not limited to video, object, user, and other data and information as described herein. The streaming service interface 2602 may, for example, be implemented according to a streaming service 2504 as illustrated in FIG. 13. RVE system 2600 may also include video playback and recording 2606 module(s), graphics processing and rendering 2608 module(s), and RVE control module 2604.

In response to user selection of a video for playback, video playback and recording 2606 module(s) may obtain pre-rendered, pre-recorded video from a video source 2650, process the video as necessary, and stream the pre-recorded video to the respective client device 2680 via streaming service interface 2602. During an RVE event in which the user pauses a video being played back, steps into a scene, and explores and possibly modifies the scene, graphics processing and rendering 2608 module may obtain 2D or 3D data from one or more data sources 2660, generate a modeled world for the scene according to the 2D or 3D data, render 2D representations of the modeled world from user-controlled camera viewpoints, and stream the real-time rendered video to the respective client device 2680 via streaming service interface 2602. In at least some embodiments, the newly rendered video content can be recorded by video playback and recording 2606 module(s).

The RVE system 2600 may also include an RVE control module 2604 that receives input and interactions from an RVE client 2682 on a respective client device 2680 via streaming service interface 2602, processes the input and interactions, and directs operations of video playback and recording 2606 module(s) and graphics processing and rendering 2608 module accordingly. In at least some embodiments, RVE control module 2604 may also track operations of video playback and recording 2606 module(s). For example, RVE control module 104 may track playback of a given video through video playback and recording 2606 module(s), module so that RVE control module 2604 can determine which scene is currently being played back to a given client device.

In at least some embodiments, RVE client 2682 may implement a streaming service client interface as RVE client interface 2684. User interactions with a video being played back to the client device 2680, for example using RVE controls implemented on the client device 2680, may be sent from client device 2680 to RVE system 2600 according to the streaming service interfaces 2684 and 2602. Rather than performing rendering of new 2D or 3D content on the client device 2680, graphics processing and rendering 2608 module(s) of RVE system 2600 may generate and render new video content for scenes being explored in real-time in response to the user input received from RVE client 2680. Streaming service interface 2602 may stream video content from RVE system 2600 to RVE client 2682 according to a streaming protocol. At the client device 2680, the RVE client interface 2685 receives the streamed video, extracts the video from the stream protocol, and provides the video to the RVE client 2682, which displays the video to the client device 2680.

Example Provider Network Environment

Embodiments of the systems and methods as described herein, including real-time video explorer (RVE) systems and methods, game systems and methods, image collection modules or services, virtual world generation engines or services, and digital asset repositories may be implemented in the context of a service provider that provides resources (e.g., computing resources, storage resources, database (DB) resources, etc.) on a provider network to clients of the service provider. FIG. 15 illustrates an example service provider network environment in which embodiments of the systems and methods as described herein may be implemented. FIG. 15 schematically illustrates an example of a provider network 2910 that can provide computing and other resources to users 2900*a* and 2900*b* (which may be referred herein singularly as user 2900 or in the plural as users 2900) via user computers 2902*a* and 2902*b* (which may be referred herein singularly as computer 2902 or in the plural as computers 2902) via a intermediate network 2930. Provider network 2910 may be configured to provide the resources for executing applications on a permanent or an as-needed basis. In at least some embodiments, resource instances may be provisioned via one or more provider network services 2911, and may be rented or leased to clients of the service provider, for example to an RVE or game system provider 2970. At least some of the resource instances on the provider network 2910 (e.g., computing resources) may be implemented according to hardware virtualization technology that enables multiple operating systems to run concurrently on a host computer (e.g., a host 2916), i.e. as virtual machines (VMs) 2918 on the host.

The computing resources provided by provider network 2910 may include various types of resources, such as gateway resources, load balancing resources, routing resources, networking resources, computing resources, volatile and non-volatile memory resources, content delivery resources, data processing resources, data storage resources, database resources, data communication resources, data streaming resources, and the like. Each type of computing resource may be general-purpose or may be available in a number of specific configurations. For example, data processing resources may be available as virtual machine instances that may be configured to provide various services. In addition, combinations of resources may be made available via a network and may be configured as one or more services. The instances may be configured to execute applications, including services such as application services, media services, database services, processing services, gateway services, storage services, routing services, security services, encryption services, load balancing services, and so on. These services may be configurable with set or custom applications and may be configurable in size, execution, cost, latency, type, duration, accessibility, and in any other dimension. These services may be configured as available infrastructure for one or more clients and can include one or more applications configured as a platform or as software for one or more clients.

These services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources consisting of many processors, large amounts of memory and/or large storage capacity, and small resources consisting of fewer processors, smaller amounts of memory and/or smaller storage capacity. Customers may choose to allocate a number of small processing resources as web servers and/or one large processing resource as a database server, for example.

Provider network 2910 may include hosts 2916*a* and 2916*b* (which may be referred herein singularly as host 2916 or in the plural as hosts 2916) that provide computing resources. These resources may be available as bare metal resources or as virtual machine instances 2918*a-d* (which may be referred herein singularly as virtual machine instance 2918 or in the plural as virtual machine instances 2918). Virtual machine instances 2918*c* and 2918*d* are shared state virtual machine ("SSVM") instances. The SSVM virtual machine instances 2918*c* and 2918*d* may be configured to perform all or any portion of the RVE, game, image collection, virtual world generation, and digital asset repository methods as described herein. As should be appreciated, while the particular example illustrated in FIG. 15 includes one SSVM 2918 virtual machine in each host, this is merely an example. A host 2916 may include more than one SSVM 2918 virtual machine or may not include any SSVM 2918 virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 15, intermediate network 2930 may, for example, be a publicly accessible network of linked networks and possibly operated by various distinct parties, such as the Internet. In other embodiments, intermediate network 2930 may be a local and/or restricted network, such as a corporate or university network that is wholly or partially inaccessible to non-privileged users. In still other embodiments, intermediate network 2930 may include one or more local networks with access to and/or from the Internet.

Intermediate network 2930 may provide access to one or more client devices 2902. User computers 2902 may be computing devices utilized by users 2900 or other customers of provider network 2910. For instance, user computer 2902*a* or 2902*b* may be a server, a desktop or laptop personal computer, a tablet computer, a wireless telephone, a personal digital assistant (PDA), an e-book reader, a game console, a set-top box or any other computing device capable of accessing provider network 2910 via wired and/or wireless communications and protocols. In some instances, a user computer 2902*a* or 2902*b* may connect directly to the Internet (e.g., via a cable modem or a Digital Subscriber Line (DSL)). Although only two user computers 2902*a* and 2902*b* are depicted, it should be appreciated that there may be multiple user computers.

User computers 2902 may also be utilized to configure aspects of the computing, storage, and other resources provided by provider network 2910 via provider network services 2911. In this regard, provider network 2910 might provide a gateway or web interface through which aspects of its operation may be configured through the use of a web browser application program executing on a user computer 2902. Alternatively, a stand-alone application program executing on a user computer 2902 might access an application programming interface (API) exposed by a service 2911 of provider network 2910 for performing the configuration operations. Other mechanisms for configuring the operation of various resources available at provider network 2910 might also be utilized.

Hosts 2916 shown in FIG. 15 may be standard host devices configured appropriately for providing the computing resources described above and may provide computing resources for executing one or more services and/or applications. In one embodiment, the computing resources may be virtual machine instances 2918. In the example of virtual machine instances, each of the hosts 2916 may be configured to execute an instance manager 2920a or 2920b (which may be referred herein singularly as instance manager 2920 or in the plural as instance managers 2920) capable of executing the virtual machine instances 2918. An instance manager 2920 may be a hypervisor or virtual machine monitor (VMM) or another type of program configured to enable the execution of virtual machine instances 2918 on a host 2916, for example. As discussed above, each of the virtual machine instances 2918 may be configured to execute all or a portion of an application or service.

In the example provider network 2910 shown in FIG. 15, a router 2914 may be utilized to interconnect the hosts 2916a and 2916b. Router 2914 may also be connected to gateway 2940, which is connected to intermediate network 2930. Router 2914 may be connected to one or more load balancers, and alone or in combination may manage communications within provider network 2910, for example, by forwarding packets or other data communications as appropriate based on characteristics of such communications (e.g., header information including source and/or destination addresses, protocol identifiers, size, processing requirements, etc.) and/or the characteristics of the network (e.g., routes based on network topology, subnetworks or partitions, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example provider network 2910 shown in FIG. 15, a host manager 2915 may also be employed to at least in part direct various communications to, from and/or between hosts 2916a and 2916b. While FIG. 15 depicts router 2914 positioned between gateway 2940 and host manager 2915, this is given as an example configuration and is not intended to be limiting. In some cases, for example, host manager 2915 may be positioned between gateway 2940 and router 2914. Host manager 2915 may, in some cases, examine portions of incoming communications from user computers 2902 to determine one or more appropriate hosts 2916 to receive and/or process the incoming communications. Host manager 2915 may determine appropriate hosts to receive and/or process the incoming communications based on factors such as an identity, location or other attributes associated with user computers 2902, a nature of a task with which the communications are associated, a priority of a task with which the communications are associated, a duration of a task with which the communications are associated, a size and/or estimated resource usage of a task with which the communications are associated and many other factors. Host manager 2915 may, for example, collect or otherwise have access to state information and other information associated with various tasks in order to, for example, assist in managing communications and other operations associated with such tasks.

It should be appreciated that the network topology illustrated in FIG. 15 has been greatly simplified and that many more networks and networking devices may be utilized to interconnect the various computing systems disclosed herein. These network topologies and devices should be apparent to those skilled in the art.

It should also be appreciated that provider network 2910 described in FIG. 15 is given by way of example and that other implementations might be utilized. Additionally, it should be appreciated that the functionality disclosed herein might be implemented in software, hardware or a combination of software and hardware. Other implementations should be apparent to those skilled in the art. It should also be appreciated that a host, server, gateway or other computing device may comprise any combination of hardware or software that can interact and perform the described types of functionality, including without limitation desktop or other computers, database servers, network storage devices and other network devices, PDAs, tablets, cell phones, wireless phones, pagers, electronic organizers, Internet appliances, television-based systems (e.g., using set top boxes and/or personal/digital video recorders), game systems and game controllers, and various other consumer products that include appropriate communication and processing capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Illustrative System

In at least some embodiments, a computing device that implements a portion or all of the technologies as described herein may include a general-purpose computer system that includes or is configured to access one or more computer-readable media, such as computer system 3000 illustrated in FIG. 16. In the illustrated embodiment, computer system 3000 includes one or more processors 3010 coupled to a system memory 3020 via an input/output (I/O) interface 3030. Computer system 3000 further includes a network interface 3040 coupled to I/O interface 3030.

In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computer system 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computer system 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040.

CONCLUSION

Various embodiments may further include receiving, sending or storing instructions and/or data implemented in accordance with the foregoing description upon a computer-readable medium. Generally speaking, a computer-readable medium may include storage media or memory media such as magnetic or optical media, e.g., disk or
DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices that implement a real-time video exploration (RVE) system, configured to:
receive input from a client device indicating user interactions with a playback of a video content depicting a real-world scene on the client device;
in response to the user interactions:
pause the playback of the video content;
generate a model of the real-world scene from images associated with the real-world scene, wherein the model includes graphics data about the real-world scene;
receive further input from the client device indicating a manipulation of the real-world scene during an interactive exploration of the real-world scene;
in response to the manipulation:
determine, while the playback of the video content is paused, that a change in the graphics data of the model of the real-world scene is required as a result of the manipulation during the interactive exploration of the real-world scene;
modify, while the playback of the video content is paused, the model of the real-world scene to include the change in the graphics data;
render new video content of the real-world scene using the graphics data in the model as modified; and
stream the new video content to a plurality of devices comprising the client device and one or more devices other than the client device.

2. The system as recited in claim 1, wherein to generate the model of the real-world scene from images, the RVE system is configured to:
identify the images from a repository of crowdsourced images for different scenes, wherein at least some of the images in the repository are obtained from a plurality of online contributors.

3. The system as recited in claim 1, wherein to generate the model of the real-world scene from the images, the RVE system is configured to:
align the images according to respective content of the images or respective image metadata indicating positioning of the images;
merge at least portions of the aligned images to generate a composited image; and
generate the model according to the composite image.

4. The system as recited in claim 1, wherein to generate the model of the real-world scene from the images, the RVE system is configured to:
generate a 3D model of the real-world scene from 2D images associated with the real-world scene.

5. The system as recited in claim 1, wherein the RVE system is implemented as an online gaming service using resources provided by a network-accessible service provider network.

6. The system as recited in claim 1, wherein the RVE system is configured to:
responsive to additional input from the client device indicating user interactions with the real-world scene, provide one or more of the images associated with the real-world scene to the client device.

7. The system as recited in claim 1, wherein the RVE system is configured to:
responsive to additional input from the client device indicating user interactions to manipulate an object in the real-world scene, render and stream subsequent video content including the object as manipulated as a result of the user interactions.

8. The system as recited in claim 7, wherein:
the additional input from the client device indicates a change of a color or a texture of the object; and
the subsequent video content includes the object with the color or the texture as changed.

9. The system as recited in claim 7, wherein the RVE system is configured to receive input from the client device to purchase the object in the subsequent video content.

10. The system as recited in claim 7, wherein:
the additional input from the client device indicates to open a door or a compartment in the real-world scene; and
the subsequent video content includes an additional portion of the real-world scene that was not visible prior to the opening of the door or the compartment.

11. The system as recited in claim 1, wherein the RVE system is configured to:
responsive to additional input from the client device, resume the playback of the video content depicting a real-world scene prior to the generation of the model.

12. A method, comprising:
performing, by a real-time video exploration (RVE) system implemented by one or more computing devices:
receiving input from a client device indicating user interactions with a playback of a video content depicting a real-world scene on the client device;
in response to the user interactions:
pausing the playback of the video content;
generating a model of the real-world scene from images associated with the real-world scene, wherein the model includes graphics data about the real-world scene;
receiving further input from the client device indicating a manipulation of the real-world scene during an interactive exploration of the real-world scene;
in response to the manipulation:
determining, while the playback of the video content is paused, that a change in the graphics data of the model of the real-world scene is required as a result of the manipulation during the interactive exploration of the real-world scene;
modifying, while the playback of the video content is paused, the model of the real-world scene to include the change in the graphics data;
rendering new video content of the real-world scene using the graphics data in the model as modified; and
streaming the new video content to the client device.

13. The method as recited in claim 12, wherein said generating the model of the real-world scene from images comprises:
identifying the images from a repository of crowdsourced images for different scenes, wherein at least some of the images in the repository are obtained from a plurality of online contributors.

14. The method as recited in claim 12, wherein said generating the model of the real-world scene from the images comprises:
generating a 3D model of the real-world scene from 2D images associated with the real-world scene.

15. The method as recited in claim 12, further comprising:
responsive to additional input from the client device indicating user interactions with the real-world scene, providing one or more of the images associated with the real-world scene to the client device.

16. The method as recited in claim 12, further comprising:
responsive to additional input from the client device indicating user interactions to manipulate an object in the real-world scene, rendering and streaming subsequent video content including the object as manipulated as a result of the user interactions.

17. The method as recited in claim 16, wherein:
the additional input from the client device indicates a change of a color or a texture of the object; and
the subsequent video content includes the object with the color or the texture as changed.

18. The method as recited in claim 16, further comprising receiving input from the client device to purchase the object in the subsequent video content.

19. The method as recited in claim 16, wherein:
the additional input from the client device indicates to open a door or a compartment in the real-world scene; and
the subsequent video content includes an additional portion of the real-world scene that was not visible prior to the opening of the door or the compartment.

20. The method as recited in claim 12, further comprising:
responsive to additional input from the client device, resuming the playback of the video content depicting a real-world scene prior to the generation of the model.

* * * * *